US012713322B2

(12) United States Patent
Muraoka et al.

(10) Patent No.: US 12,713,322 B2
(45) Date of Patent: Aug. 18, 2026

(54) RADIO CONTROL APPARATUS, METHOD AND RECORDING MEDIUM

(71) Applicant: NEC Corporation, Tokyo (JP)

(72) Inventors: Kazushi Muraoka, Tokyo (JP); Toshiki Takeuchi, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 18/290,477

(22) PCT Filed: Oct. 15, 2021

(86) PCT No.: PCT/JP2021/038298
§ 371 (c)(1),
(2) Date: Nov. 14, 2023

(87) PCT Pub. No.: WO2022/249508
PCT Pub. Date: Dec. 1, 2022

(65) Prior Publication Data

US 2024/0284291 A1 Aug. 22, 2024

Related U.S. Application Data

(60) Provisional application No. 63/193,639, filed on May 27, 2021.

(51) Int. Cl.
*H04W 36/32* (2009.01)
*H04W 64/00* (2009.01)

(52) U.S. Cl.
CPC ....... *H04W 36/322* (2023.05); *H04W 36/324* (2023.05); *H04W 64/003* (2013.01)

(58) Field of Classification Search
CPC ............. H04W 36/322; H04W 36/324; H04W 64/003; H04W 64/006; H04W 16/28;
(Continued)

(56) References Cited

U.S. PATENT DOCUMENTS

2014/0179332 A1* 6/2014 Qian ......................... H04L 1/20 455/452.1
2017/0317729 A1 11/2017 Kobayashi et al.
(Continued)

FOREIGN PATENT DOCUMENTS

JP 2006-217228 A 8/2006
JP 2010-081551 A 4/2010
(Continued)

OTHER PUBLICATIONS

English translation of Written opinion for PCT Application No. PCT/JP2021/038298, mailed on Dec. 28, 2021.
(Continued)

*Primary Examiner* — Nimesh Patel
(74) *Attorney, Agent, or Firm* — Sughrue Mion, PLLC.

(57) ABSTRACT

In order to control radio communication with a terminal apparatus in accordance with a movement situation of the terminal apparatus, a radio control apparatus is configured to estimate a location of the terminal apparatus, estimate a type of the terminal apparatus, predict movement of the terminal apparatus based on the estimated location, predict a future location of the terminal apparatus, estimate, based on the estimated type, a reception level of a radio signal at the future location for each communication parameter, and determine the communication parameter to be used for the terminal apparatus at the future location, based on an estimation result of the reception level.

19 Claims, 21 Drawing Sheets

(58) Field of Classification Search

CPC ....... H04W 64/00; H04W 4/029; H04W 4/40; H04W 4/023; H04W 4/021; H04W 4/02; H04W 4/06; H04W 4/44; H04W 28/0226; H04W 4/027; H04W 8/08; H04W 48/06; H04W 72/046; H04W 76/10; H04W 84/005; H04W 4/024; H04W 4/025; H04W 52/285; H04W 4/50; H04W 72/52; H04W 36/0009; H04W 72/51; H04W 36/32; H04W 4/022; H04W 52/223; H04W 52/283; H04W 52/322; H04W 72/00; H04W 8/12; H04W 12/63; H04W 12/76; H04W 16/18; H04W 12/61; H04W 36/008375; H04W 60/04; H04W 84/042; H04W 84/12; H04W 88/06; H04W 8/22; H04W 36/08; H04W 48/20; H04L 67/52; H04L 67/12; H04L 12/1407; H04L 67/306; H04L 67/535; H04L 41/16; H04L 2209/80; H04L 41/0803; Y02D 30/70; G08G 1/166; G08G 1/144; G08G 1/164; G08G 1/163; G08G 1/0104; G08G 1/123; G08G 1/00; G08G 1/205; G08G 1/13; G08G 1/20; G08G 1/0112; G08G 1/012; G08G 1/0133; G08G 1/0145; H04B 7/0617; H04B 7/06952; H04B 7/0408; H04B 17/318; H04B 7/088; H04B 17/328; H04B 7/0626; H04B 7/0695; H04B 7/0413; H04B 7/0632; H04B 7/18591; G06N 3/045; G06N 20/00; G06N 3/08; G06N 10/20; G06N 10/60; G06N 3/006; G06N 3/0455; G06N 3/09; G06N 3/0464; G06N 3/098; H04M 15/66; H04M 15/8016; H04M 15/8228; H04M 15/85; H04M 1/72457; H04M 1/72472; G01S 13/04; G01S 5/0236; G01S 5/0284; G01S 13/56; G01S 2205/008; G01S 5/0027; G01S 2205/002

See application file for complete search history.

(56) References Cited

U.S. PATENT DOCUMENTS

| | | | | |
|---|---|---|---|---|
| 2019/0260455 | A1* | 8/2019 | Ryu | H04B 7/0695 |
| 2019/0364492 | A1 | 11/2019 | Azizi et al. | |
| 2020/0090194 | A1* | 3/2020 | Kurian | G01C 21/3492 |
| 2020/0259878 | A1* | 8/2020 | Yang | H04L 65/765 |
| 2021/0105057 | A1* | 4/2021 | Lundborg | H04W 28/095 |
| 2021/0111953 | A1* | 4/2021 | Hall | H04W 48/14 |
| 2021/0297172 | A1* | 9/2021 | Jornod | H04B 17/27 |
| 2022/0217574 | A1* | 7/2022 | Alieiev | H04W 72/52 |
| 2022/0287083 | A1* | 9/2022 | Gomes Baltar | H04W 74/0808 |
| 2023/0262448 | A1* | 8/2023 | Rydén | G06N 3/098 455/418 |

FOREIGN PATENT DOCUMENTS

| | | | |
|---|---|---|---|
| JP | 2019-134217 | A | 8/2019 |
| JP | 2020-507233 | A | 3/2020 |
| WO | 2016/157727 | A1 | 10/2016 |
| WO | 2018/092375 | A1 | 5/2018 |
| WO | 2019/125255 | A1 | 6/2019 |
| WO | 2019/155632 | A1 | 8/2019 |

OTHER PUBLICATIONS

International Search Report for PCT Application No. PCT/JP2021/038298, mailed on Dec. 28, 2021.

Written opinion for PCT Application No. PCT/JP2021/038298, mailed on Dec. 28, 2021.

Takashi Seyama, Teppei Oyama and Takashi Dateki, "A Study of Proactive Beam Forming Control using Machine Learning for 5G Mobile Communication System," IEICE Technical Report vol. 118, No. 57, SR2018-7, pp. 43-48, May 2018.

* cited by examiner

Fig. 3

200
220
221
NETWORK COMMUNICATION UNIT
222
STORING UNIT
223
PROCESSING UNIT
210-1
210-2
210-N

| 710 TERMINAL IDENTIFIER | 720 LOCATION | 730 ANTENNA NUMBER | 740 BEAM NUMBER | 750 RECEIVED POWER INFORMATION |
|---|---|---|---|---|
| UE1 | P1 | An1 | Bm1 | Pw1 |
| UE2 | P2 | An2 | Bm1 | Pw2 |
| UE2 | P3 | An2 | Bm2 | Pw1 |
| UE3 | P4 | An3 | Bm5 | Pw1 |
| UE4 | P5 | An3 | Bm4 | Pw2 |
| UE5 | P5 | An2 | Bm6 | Pw5 |
| --- | --- | --- | --- | --- |

| TYPE (810) | LOCATION (820) | ANTENNA NUMBER (830) | BEAM NUMBER (840) | RECEIVED POWER INFORMATION (850) |
|---|---|---|---|---|
| FIRST TYPE | P1 | An1 | Bm1 | Pw4 |
| | P1 | An2 | Bm1 | Pw2 |
| | P1 | An2 | Bm3 | Pw3 |
| | P3 | An2 | Bm2 | Pw2 |
| | --- | --- | --- | --- |
| SECOND TYPE | P1 | An1 | Bm1 | Pw1 |
| | P1 | An4 | Bm4 | Pw2 |
| | P1 | An5 | Bm5 | Pw3 |
| | P5 | An9 | Bm6 | Pw5 |
| | --- | --- | --- | --- |
| THIRD TYPE | P2 | An7 | Bm10 | Pw3 |
| | P2 | An9 | Bm11 | Pw7 |
| | P9 | An10 | Bm12 | Pw6 |
| | --- | --- | --- | --- |

Figure 14:
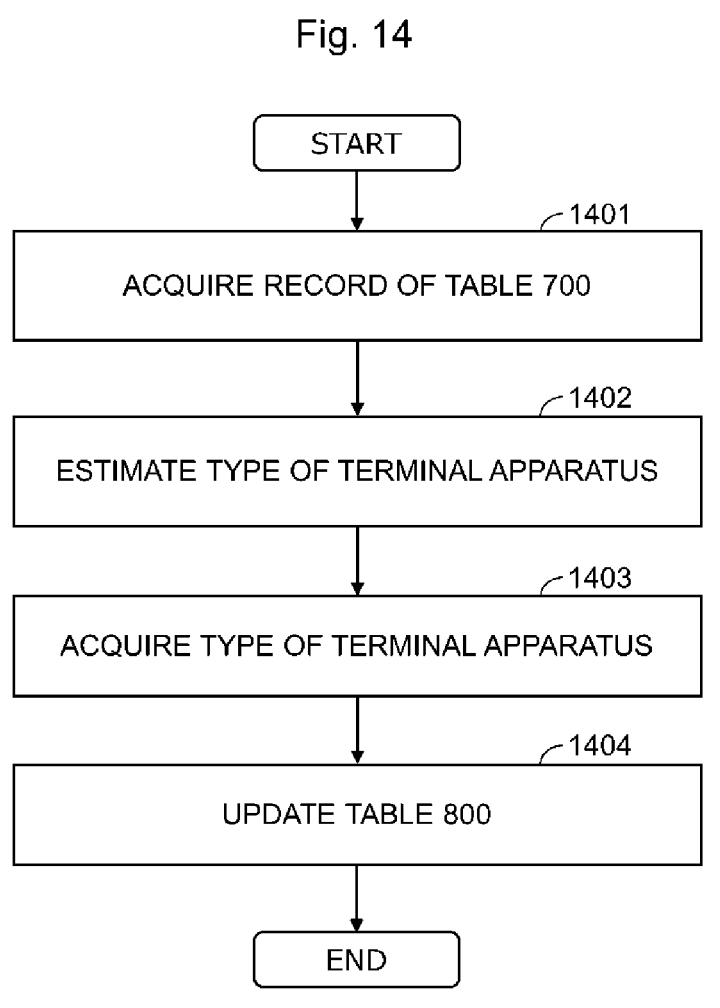

START

1401 ACQUIRE RECORD OF TABLE 700

1402 ESTIMATE TYPE OF TERMINAL APPARATUS

1403 ACQUIRE TYPE OF TERMINAL APPARATUS

1404 UPDATE TABLE 800

END

Fig. 15

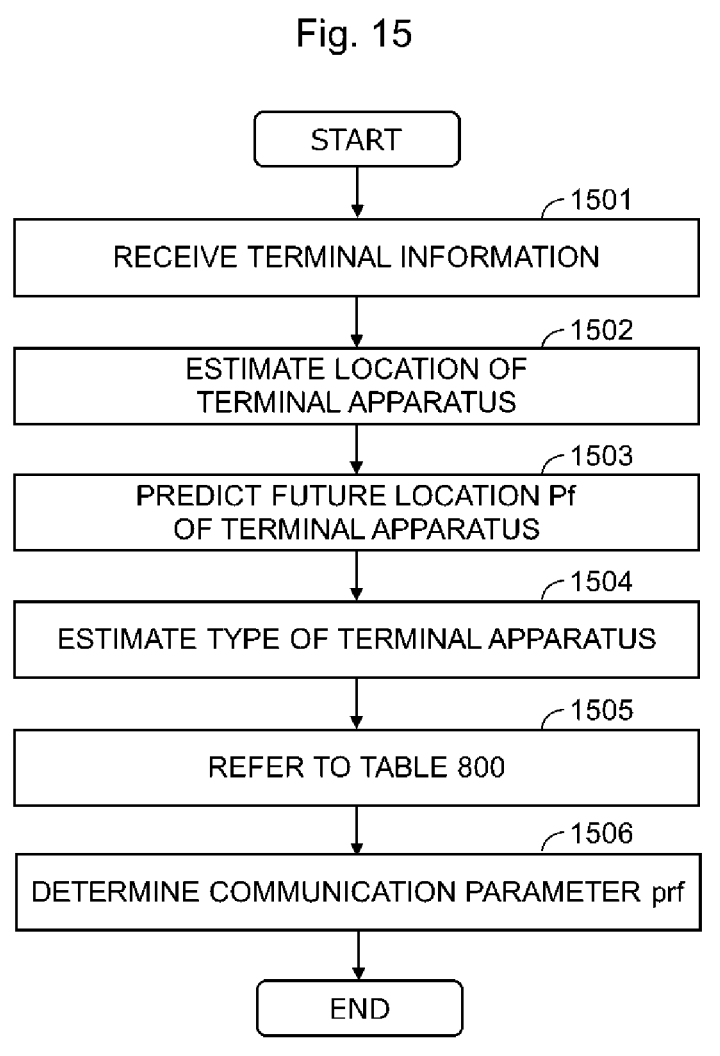

START

1501 RECEIVE TERMINAL INFORMATION

1502 ESTIMATE LOCATION OF TERMINAL APPARATUS

1503 PREDICT FUTURE LOCATION Pf OF TERMINAL APPARATUS

1504 ESTIMATE TYPE OF TERMINAL APPARATUS

1505 REFER TO TABLE 800

1506 DETERMINE COMMUNICATION PARAMETER prf

END

| TERMINAL IDENTIFIER (710) | LOCATION (720) | ANTENNA NUMBER (730) | BEAM NUMBER (740) | RECEIVED POWER INFORMATION (750) | TIME (760) |
|---|---|---|---|---|---|
| UE1 | P1 | An1 | Bm1 | Pw1 | yyyy-MM-dd HH:mm:ss |
| UE2 | P2 | An2 | Bm1 | Pw2 | yyyy-MM-dd HH:mm:ss |
| UE2 | P3 | An2 | Bm2 | Pw1 | yyyy-MM-dd HH:mm:ss |
| --- | --- | --- | --- | --- | --- |

| TYPE (810) | LOCATION (820) | ANTENNA NUMBER (830) | BEAM NUMBER (840) | RECEIVED POWER INFORMATION (850) | TIME (860) |
|---|---|---|---|---|---|
| FIRST TYPE | P1 | An1 | Bm1 | Pw4 | yyyy-MM-dd HH:mm:ss |
| | P1 | An2 | Bm1 | Pw2 | yyyy-MM-dd HH:mm:ss |
| | --- | --- | --- | --- | --- |
| SECOND TYPE | P1 | An3 | Bm1 | Pw1 | yyyy-MM-dd HH:mm:ss |
| | P5 | An9 | Bm6 | Pw5 | yyyy-MM-dd HH:mm:ss |
| | --- | --- | --- | --- | --- |
| THIRD TYPE | P2 | An7 | Bm10 | Pw3 | yyyy-MM-dd HH:mm:ss |
| | --- | --- | --- | --- | --- |

| TERMINAL IDENTIFIER (1810) | LOCATION (1820) | ANTENNA NUMBER (1830) | BEAM NUMBER (1840) | RECEIVED POWER INFORMATION (1850) |
|---|---|---|---|---|
| UE1 | P1 | An1 | Bm1 | Pw1 |
| UE2 | P2 | An2 | Bm1 | Pw2 |
| UE2 | P3 | An2 | Bm2 | Pw1 |
| UE3 | P4 | An3 | Bm5 | Pw1 |
| UE4 | P5 | An3 | Bm4 | Pw2 |
| UE5 | P5 | An2 | Bm6 | Pw5 |
| --- | --- | --- | --- | --- |

| TYPE (810) | LOCATION (820) | ANTENNA NUMBER (830) | BEAM NUMBER (840) | RECEIVED POWER INFORMATION (850) | LINK (870) |
|---|---|---|---|---|---|
| FIRST TYPE | P1 | An1 | Bm1 | Pw4 | UPLINK |
| | P1 | An2 | Bm1 | Pw2 | DOWNLINK |
| | --- | --- | --- | --- | --- |
| SECOND TYPE | P1 | An3 | Bm1 | Pw1 | UPLINK |
| | P5 | An9 | Bm6 | Pw5 | DOWNLINK |
| | --- | --- | --- | --- | --- |
| THIRD TYPE | P2 | An7 | Bm10 | Pw3 | UPLINK |
| | --- | --- | --- | --- | --- |

Fig. 21

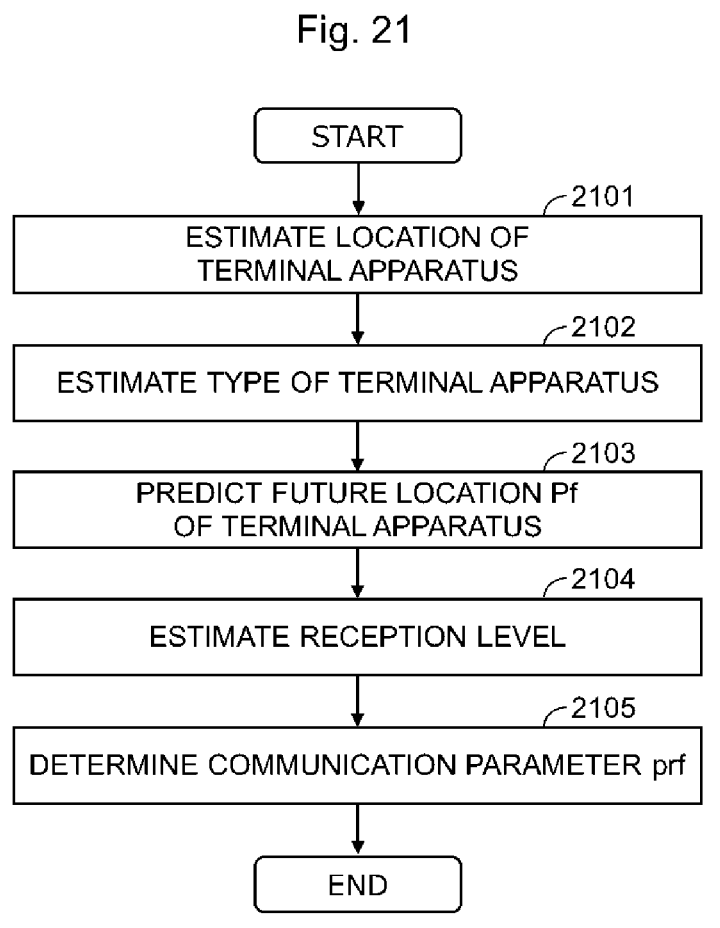

START

2101 ESTIMATE LOCATION OF TERMINAL APPARATUS

2102 ESTIMATE TYPE OF TERMINAL APPARATUS

2103 PREDICT FUTURE LOCATION Pf OF TERMINAL APPARATUS

2104 ESTIMATE RECEPTION LEVEL

2105 DETERMINE COMMUNICATION PARAMETER prf

END

RADIO CONTROL APPARATUS, METHOD AND RECORDING MEDIUM

This application is a National Stage Entry of PCT/JP2021/038298 filed on Oct. 15, 2021, which claims priority from U.S. Provisional Application 63/19363 filed on May 27, 2021, the contents of all of which are incorporated herein by reference, in their entirety.

TECHNICAL FIELD

The present disclosure relates to a control apparatus, a method, and a recording medium.

BACKGROUND ART

Radio communication technologies using radio waves in a high frequency band such as a millimeter wave or a terahertz wave have been studied to achieve high capacity in mobile communication systems. In the above-mentioned radio communication technologies, there is a problem of large propagation loss depending on the frequency. To solve the above problem, for example, a radio control apparatus (e.g., a radio base station) is configured to perform beamforming using an antenna array including a plurality of antenna elements.

Hereafter, a combination of radio waves (signals) transmitted or received by a plurality of antenna elements is referred to as "beam". Specifically, a beam obtained by combining signals transmitted by the plurality of antenna elements is referred to as "transmitting beam". A beam obtained by combining signals received by the plurality of antenna elements is referred to as "receiving beam".

The beamforming is control for controlling the phase and amplitude of radio signals transmitted or received by the plurality of antenna elements to change the direction (angle) of the beam. Such control is well known and is also referred to as "directivity control". According to this technique, the beam is formed toward a direction in which a communication target exists, thus compensating for propagation loss.

PTL 1, PTL 2, PTL 3, and NPL 1 disclose techniques related to the beamforming, respectively. PTL 4 discloses a technique for forming a beam in accordance with location information of a mobile terminal. PTL 5 discloses a technique for performing radio control based on a communication quality of a user apparatus.

CITATION LIST

Patent Literature

[PTL 1] JP 2020-507233 T
[PTL 2] JP 2019-134217 A
[PTL 3] WO 2016/157727
[PTL 4] JP 2006-217228 A
[PTL 5] WO 2019/155632

Non Patent Literature

[NPL 1] Takashi Seyama, Teppei Oyama, Takashi Dateki, "A Study of Proactive Beam Forming Control using Machine Learning for 5G Mobile Communication System", Institute of Electronics, Information and Communication Engineers, Technical Report, vol. 118, no. 57, SR2018-7, pp. 43-48, May 2018

SUMMARY

Technical Problem

For example, it is assumed that, in a radio communication system, a radio base station performs radio communication with a terminal apparatus while performing the beamforming. There can be two or more situations in which the terminal apparatus is moving. Such situations include a situation in which the terminal apparatus is moving with a pedestrian, a situation in which the terminal apparatus is moving with a vehicle, and the like. Since the radio base station performs the beamforming without considering the moving condition of the terminal apparatus, the reception level at the terminal apparatus of a radio signal transmitted from the radio base station may be significantly decreased. As a result, the radio link between the radio base station and the terminal apparatus may be disconnected (so-called Radio Link Failure).

The present disclosure provides a technique that enables control for radio communication with a terminal apparatus in accordance with a moving situation of the terminal apparatus.

Solution to Problem

In one or more example embodiments, a radio control apparatus is provided. The radio control apparatus includes a location estimation unit configured to estimate a location of a terminal apparatus, a type estimation unit configured to estimate a type of the terminal apparatus, a movement prediction unit configured to predict movement of the terminal apparatus based on the estimated location, and predict a future location of the terminal apparatus, and a selection unit configured to estimate, based on the estimated type, a reception level of a radio signal at the future location for each communication parameter representing one or both of an antenna and a beam, and determine the communication parameter to be used for the terminal apparatus at the future location, based on an estimation result of the reception level.

In one or more example embodiments, a method performed in a radio control apparatus communicating with a terminal apparatus is provided. The method includes estimating a location of the terminal apparatus, estimating a type of the terminal apparatus, predicting movement of the terminal apparatus based on the estimated location, predicting a future location of the terminal apparatus, estimating, based on the estimated type, a reception level of a radio signal at the future location for each communication parameter representing one or both of an antenna and a beam, determining the communication parameter to be used for the terminal apparatus at the future location, based on an estimation result of the reception level.

In one or more example embodiments, a non-transitory computer readable recording medium is provided. The non-transitory recording medium stores a program causing a processor to execute estimating a location of a terminal apparatus, estimating a type of the terminal apparatus, predicting movement of the terminal apparatus based on the estimated location, predicting a future location of the terminal apparatus, estimating, based on the estimated type, a reception level of a radio signal at the future location for each communication parameter representing one or both of an antenna and a beam, and determining the communication parameter to be used for the terminal apparatus at the future location, based on an estimation result of the reception level.

Advantageous Effects of Invention

According to the above configuration, the communication parameter is determined in accordance with the type of the terminal apparatus. Therefore, it is possible to control radio communication with the terminal apparatus in accordance with a moving situation of the terminal apparatus. Issues, configurations, and effects other than those described above become apparent in the following description of the example embodiments.

BRIEF DESCRIPTION OF THE DRAWINGS

FIG. 3 is a diagram illustrating an example of a configuration of a base station apparatus;

FIG. 7 is a diagram conceptually illustrating an example of a data structure of a table included in a first database;

FIG. 8 is a diagram conceptually illustrating an example of a data structure of a table included in a second database;

FIG. 12 is a diagram illustrating a situation in which a plurality of terminal apparatuses are moving;

FIG. 13 is a flowchart for illustrating an example of a flow of processing for updating the first database;

FIG. 14 is a flowchart for illustrating an example of a flow of processing for updating the second database;

FIG. 15 is a flowchart for illustrating an example of a flow of processing for determining a communication parameter to be used for the terminal apparatus at a future location;

FIG. 16 is a diagram conceptually illustrating an example of a data structure of a table included in the first database;

FIG. 17 is a diagram conceptually illustrating an example of a data structure of a table included in the second database;

FIG. 18 is a diagram conceptually illustrating an example of a data structure of a table included in the first database;

FIG. 19 is a diagram conceptually illustrating an example of a data structure of a table included in the second database;

FIG. 21 is a flowchart for illustrating an example of a flow of processing of the radio control apparatus according to the second example embodiment.

DESCRIPTION OF THE EXAMPLE EMBODIMENTS

Figure 1:
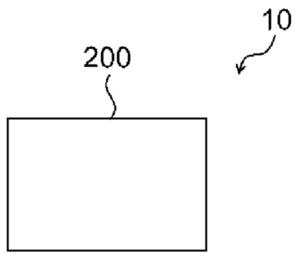
FIG. 1 is a diagram illustrating an example of a configuration of a radio communication system according to a first example embodiment.
Figure 1:

In the following, one or more example embodiments will be described with reference to the accompanying drawings.

Note that, in the Specification and drawings, elements to which similar descriptions are applicable are denoted by the same reference signs, and overlapping descriptions are hence omitted.

Descriptions will be given in the following order.

1. Overview of Example Embodiments
2. First Example Embodiment
   - 2-1. Configuration of Radio Communication System
   - 2-2. Configuration of Terminal Apparatus
   - 2-3. Configuration of Base Station Apparatus
   - 2-4. Configuration of Base Station Antenna
   - 2-5. Configuration of Main Control Apparatus
   - 2-6. Configuration of Prediction Control Unit
   - 2-7. Flow of Processing
   - 2-8. Effects
   - 2-9. Example Alterations
3. Second Example Embodiment
   - 3-1. Configuration of Radio Control Apparatus
   - 3-2. Flow of Processing

1. Overview of Example Embodiments

An overview of one or more example embodiments to be described later will be described.

(1) Technical Issues

A radio base station performs radio communication with terminal apparatuses. In this case, for example, movement situations of the terminal apparatuses may include the following situations:

a situation in which a terminal apparatus is moving with a pedestrian, and a situation in which another terminal apparatus is moving with a vehicle (e.g., a motor vehicle).

Here, it is assumed that the pedestrian and the motor vehicle are in close proximity to each other (substantially at the same location). The radio base station communicates wirelessly with the terminal apparatus held by the pedestrian and the terminal apparatus held by the motor vehicle using the same communication parameter (including an antenna and a beam). The path and speed of movement of the pedestrian, and the path and speed of movement of the motor vehicle are different from each other. In one of the above two situations, a reception level of a radio signal may be significantly decreased. Therefore, a configuration is required to control radio communication with the terminal apparatus in accordance with the respective movement situations of the terminal apparatuses (i.e., moving objects each holding the terminal apparatus).

(2) Technical Features

In one or more example embodiments, a radio control apparatus is provided. The radio control apparatus includes a location estimation unit, a type estimation unit, a movement prediction unit, and a selection unit.

The location estimation unit estimates a location of a terminal apparatus. The type estimation unit estimates a type of the terminal apparatus. The movement prediction unit predicts movement of the terminal apparatus based on the estimated location, and predicts a future location of the terminal apparatus.

The selection unit estimates, based on the estimated type, a reception level of a radio signal at the future location for each communication parameter. Here, the communication parameter is a parameter for communicating with the terminal apparatus, and represents one or both of an antenna and a beam. The selection unit determines the communication parameter to be used for the terminal apparatus at the future location, based on an estimation result of the reception level.

2. First Example Embodiment

Next, with reference to FIG. 1 to FIG. 19, a first example embodiment and example alterations thereof will be described.

2-1. Configuration of Radio Communication System

FIG. 1 is a diagram illustrating an example of a configuration of a radio communication system 10. For example, the radio communication system 10 is a system in conformity to the technical specification of Third Generation Partnership Project (3GPP). Specifically, the radio communication system 10 may be an apparatus in conformity to the technical specification of 5G. As a matter of course, the radio communication system 10 is not limited to this example.

The radio communication system 10 includes one or more terminal apparatuses 100, and a base station apparatus 200.

The terminal apparatus 100 may be referred to as a user equipment (UE), a mobile station, or the like. The terminal apparatus 100 is a mobile terminal, such as a smartphone, a mobile phone, or a tablet. Functions of the terminal apparatus 100 may be directly integrated into various vehicles (e.g., a motor vehicle and a train).

The base station apparatus 200 is, for example, a node in a radio access network (RAN). The base station apparatus 200 performs radio communication with the terminal apparatus 100.

Hereinafter, a link on which a signal is transmitted from the base station apparatus 200 to the terminal apparatus 100 is referred to as "downlink". A signal transmitted on the downlink is referred to as "downlink signal. Further, a link on which a signal is transmitted from the terminal apparatus 100 to the base station apparatus 200 is referred to as "uplink". A signal transmitted on the uplink is referred to as "uplink signal".

2-2. Configuration of Terminal Apparatus

Figure 2:
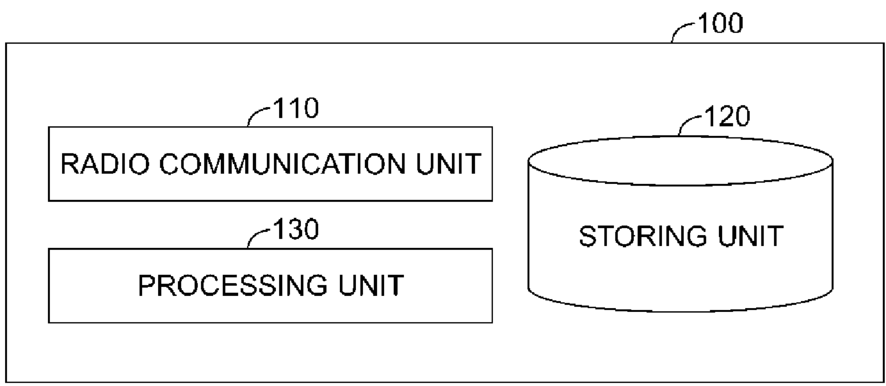
FIG. 2 is a diagram illustrating an example of a configuration of a terminal apparatus.

FIG. 2 is a block diagram illustrating an example of a configuration of the terminal apparatus 100. The terminal apparatus 100 includes a radio communication unit 110, a storing unit 120, and a processing unit 130.

The radio communication unit 110 includes an antenna for radio communication. The radio communication unit 110 transmits signals to the base station apparatus 200 via the antenna, and receives signals from the base station apparatus 200.

The storing unit 120 includes a volatile memory and a non-volatile memory. The volatile memory may include, for example, a random access memory (RAM). The non-volatile memory may include, for example, one or more of a read only memory (ROM), a hard disk drive (HDD), and a solid state drive (SSD). The non-volatile memory stores a program code (instructions) for implementing various functions of the terminal apparatus 100.

The processing unit 130 includes one or more processors. The one or more processors may include, for example, one or more of a central processing unit (CPU), a micro processing unit (MPU), and a micro controller. The processing unit 130 implements various functions of the terminal apparatus 100 by executing the program code stored in the storing unit 120.

2-3. Configuration of Base Station Apparatus

Figure 3:
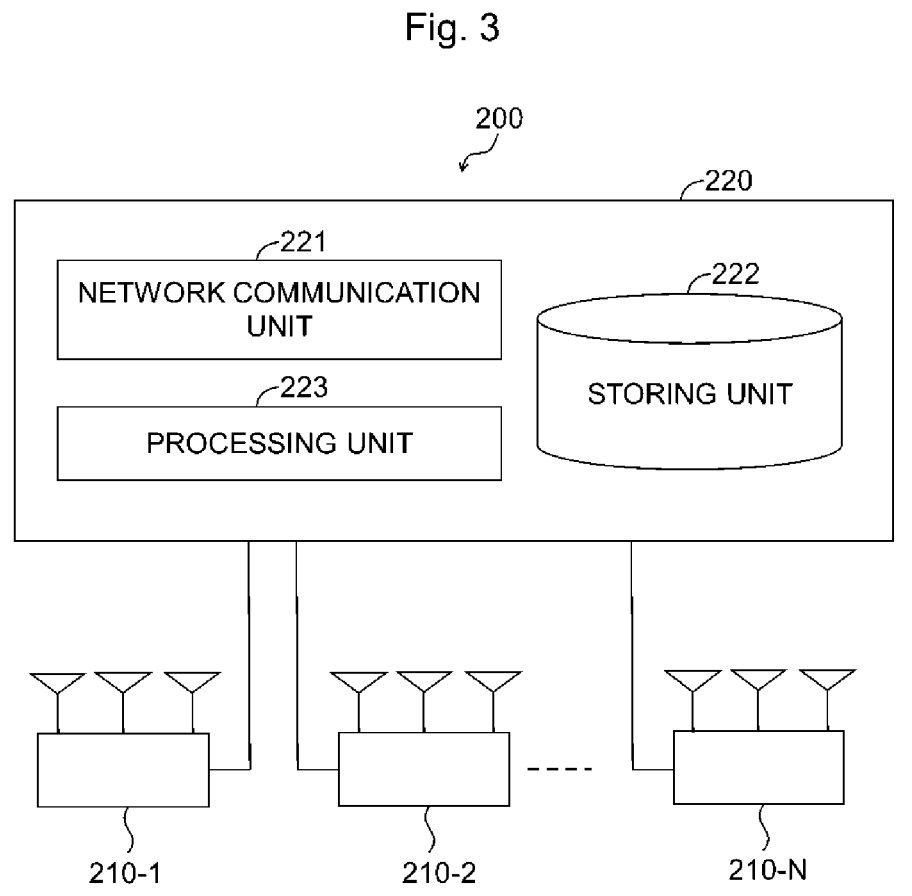

FIG. 3 is a block diagram illustrating an example of a configuration of the base station apparatus 200. The base station apparatus 200 includes a configuration of Distributed Antenna Systems (DAS).

The base station apparatus 200 includes a plurality of base station antennas 210-1, 210-2, . . . , and 210-N, and a main control apparatus 220, where N is an integer greater than or equal to 2. Hereinafter, when it is not necessary to distinguish between the plurality of base station antennas 210-1, 210-2, . . . , and 210-N, they may be simply referred to as the "plurality of base station antennas 210". The plurality of base station antennas 210 are arranged apart from each other. This configuration enables the reduction of the possibility that the communication between the base station apparatus 200 and the terminal apparatus 100 is obstructed.

Radio over Fiber (RoF) technology, Common Public Radio Interface (CPRI) technology, or evolved Common Public Radio Interface (eCPRI) technology may be used between the main control apparatus 220 and the plurality of base station antennas 210. A repeater may be provided between the main control apparatus 220 and the plurality of base station antennas 210.

The main control apparatus 220 includes a network communication unit 221, a storing unit 222, and a processing unit 223.

The network communication unit 221 transmits signals to a node (not shown) in a network (e.g., core network), and receives signals from the node in the network.

The storing unit 222 includes a volatile memory and a non-volatile memory. The volatile memory may include, for example, a RAM. The non-volatile memory may include, for example, one or more of a ROM, an HDD, and an SSD. The non-volatile memory stores a program code (instructions) for implementing various functions of the main control apparatus 220.

Further, the non-volatile memory stores information (data) used in operations of the main control apparatus 220. The non-volatile memory stores a first database 610 and a second database 620 described later.

The processing unit 223 includes one or more processors. The one or more processors may include, for example, one or more of a CPU, an MPU, and a micro controller. The processing unit 223 implements various functions of the main control apparatus 220 by executing the program code stored in the storing unit 222.

2-4. Configuration of Base Station Antenna

The plurality of base station antennas 210-1, 210-2, . . . , and 210-N have the same configuration. Hereinafter, the configuration of the base station antenna 210-1 will be described, and the description for the other base station antennas is omitted.

Figure 4:
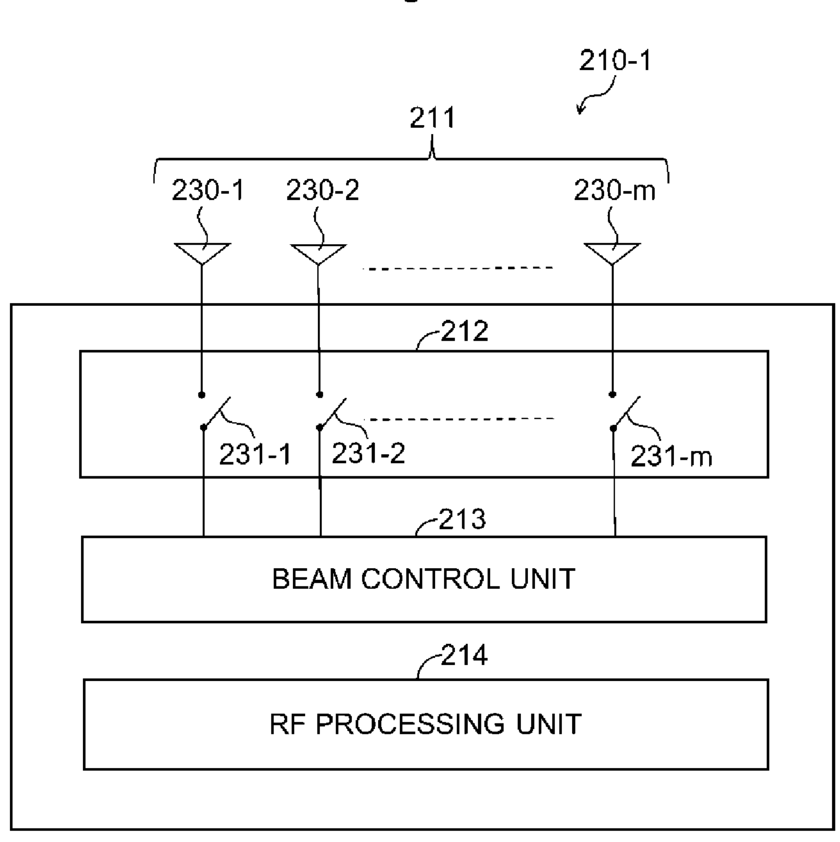
FIG. 4 is a diagram illustrating an example of a configuration of a base station antenna.

FIG. 4 is a block diagram illustrating an example of a configuration of the base station antenna 210-1. The base station antenna 210-1 includes an antenna array 211, a switch unit 212, a beam control unit 213, and a radio frequency (RF) processing unit 214.

The antenna array 211 includes a plurality of antennas (antenna elements) 230-1, 230-2, . . . , and 230-*m*, where m is an integer greater than or equal to 2. Hereinafter, for the sake of simplicity of description, one or more antennas are referenced "230" when it is not necessary to distinguish between the respective antennas.

The antenna array 211 may include a plurality of subarrays. That is, the plurality of antennas 230 may be divided into a plurality of subarrays. In this configuration, the base station antenna 210-1 may form a plurality of beams simultaneously using the plurality of subarrays.

The switch unit 212 includes a plurality of switch elements 231-1, 231-2, . . . , and 231-*m*. The plurality of switch elements 231-1, 231-2, . . . , and 231-*m* correspond to the plurality of antennas 230-1, 230-2, . . . , and 230-*m*, respectively. Hereinafter, one or more switch elements are referenced "231" when it is not necessary to distinguish between the respective switch elements. The base station antenna 210-1 may not include the switch unit 212, and the plurality of antennas 230 may be directly connected to the beam control unit 213. In this configuration, all the antennas 230 are used for transmission or reception.

The beam control unit 213 is configured to perform the beamforming. Specifically, the beam control unit 213 controls one or more switch elements 231 to select one or more antennas 230 for transmitting a radio signal. The beam control unit 213 controls the phase and amplitude of a signal (transmission signal) transmitted from the above selected antennas 230 to form a transmitting beam.

The same is applicable to the case of forming a receiving beam. The beam control unit 213 controls one or more switch elements 231 to select one or more antennas 230 for receiving a radio signal. The beam control unit 213 controls the phase and amplitude of a signal (reception signal) received from the above selected antennas 230 to form a receiving beam.

Further, the beam control unit 213 can vary beams (including the transmitting beam and the receiving beam) within a predetermined range. Hereafter, the above range is referred to as "beam steering range".

The RF processing unit 214 includes an amplifier, a frequency converter, and the like. For example, the RF processing unit 214 performs processing for modulating a baseband signal to an RF band signal (RF signal), processing for demodulating a RF signal to a baseband signal, and the like. The RF processing unit 214 may include other processing such as filter processing.

Some of the functions of the base station antenna 210-1 (e.g., the beam control unit 213 and the RF processing unit 214) may be implemented by one or more processors and a memory. The one or more processors may include, for example, one or more of a CPU, an MPU, and a micro controller. The memory includes a volatile memory and a non-volatile memory. The memory may store a program code (instructions). The one or more processors may implement the functions of the base station antenna 210-1 by executing the program code stored in the memory.

The configuration for beamforming is not limited to the above example (the antenna array 211). A directional antenna such as a lens antenna or a metamaterial antenna may be used as a configuration for beamforming.

Further, the base station antenna 210-1 may include other components. For example, the base station antenna 210-1 may further include a camera capable of capturing an image of an area corresponding to the beam steering range.

2-5. Configuration of Main Control Apparatus

Figure 5:
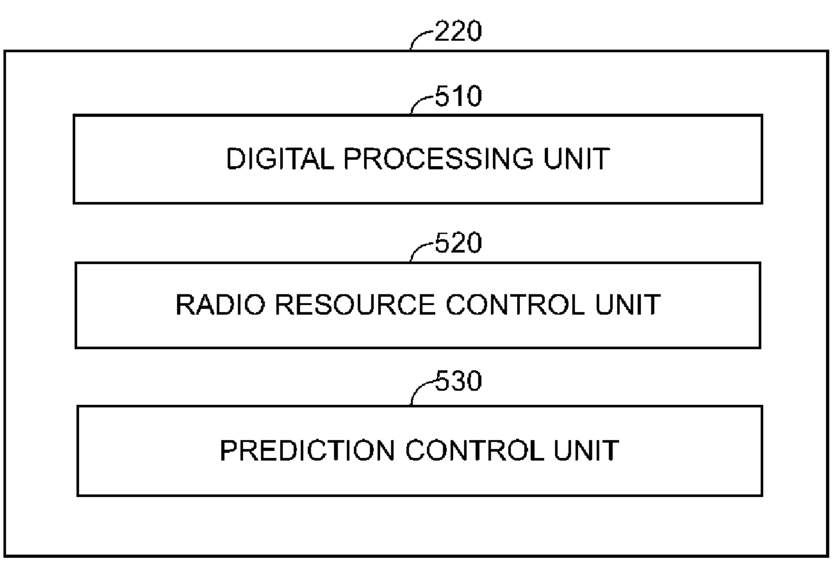
FIG. 5 is a diagram illustrating an example of a configuration of a main control apparatus.

FIG. 5 is a block diagram illustrating an example of a configuration of the main control apparatus 220. The main control apparatus 220 includes a digital processing unit 510, a radio resource control unit 520, and a prediction control unit 530. The digital processing unit 510, the radio resource control unit 520, and the prediction control unit 530 are functional modules implemented by the storing unit 222 and the processing unit 223.

The digital processing unit 510 performs processing for a downlink signal, processing for an uplink signal, and the like. For example, the digital processing unit 510 generates a radio signal (downlink signal) for Orthogonal Frequency Division Multiplexing (OFDM) transmission in the downlink. For example, the digital processing unit 510 demodulates a radio signal (uplink signal) received by the antenna array 211 to detect a Multiple Input Multiple Output (MIMO) signal.

The radio resource control unit 520 determines a radio resource for radio communication with the terminal apparatus 100. The radio resource includes an antenna, a beam, a frequency and a time, etc. The radio resource control unit 520 may also be referred to as "scheduler unit".

The prediction control unit 530 predicts a communication parameter suitable for radio communication with the terminal apparatus 100. In the present example, the communication parameter represents a combination of an antenna and a beam for radio communication with the terminal apparatus 100.

In the present example, an identifier is pre-assigned to each of the combinations of the antennas 230 that can be selected by the prediction control unit 530. Hereinafter, the identifier is referred to as "antenna number (or antenna index)".

For example, the antenna number may be a number that identifies each of the plurality of base station antennas 210-1, 210-2, . . . , and 210-N. In this example, one antenna number is assigned to one antenna array 211.

In another example, two or more antenna numbers may be assigned to one antenna array 211. That is, the plurality of antennas 230 in one antenna array 211 may be divided into a plurality of groups (e.g., a plurality of subarrays), and one antenna number may be assigned to each of the plurality of groups.

Furthermore, an identifier is pre-assigned to each of beam characteristics (including a beam direction, a beam shape pattern, etc.) that can be selected by the prediction control unit 530. Hereinafter, the identifier is referred to as "beam number (or beam index)".

Therefore, the prediction control unit 530 determines the combination of the antenna number and the beam number as the communication parameter.

The prediction control unit 530 transmits the determined communication parameter to the radio resource control unit 520. The radio resource control unit 520 receives the communication parameter from the prediction control unit 530, and determines a radio resource based on the communication parameter. The radio resource control unit 520 transmits information on the determined radio resource to the digital processing unit 510 and the beam control unit 213. The beam control unit 213 receives the information on the radio resource (including the combination of the antenna number and the beam number) from the radio resource control unit 520, and performs the beamforming based on the antenna number and the beam number.

2-6. Configuration of Prediction Control Unit

Figure 6:
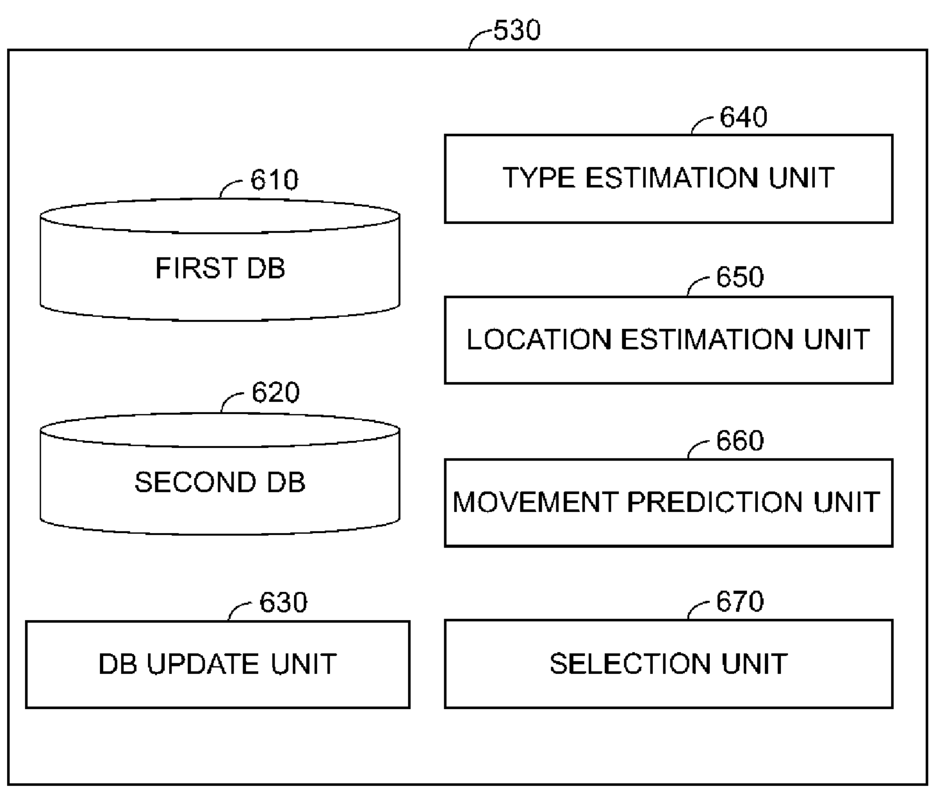
FIG. 6 is a diagram illustrating an example of a configuration of a prediction control unit.

Next, with reference to FIG. 6 to FIG. 11, a detailed configuration of the prediction control unit 530 will be described. FIG. 6 is a block diagram illustrating an example of a configuration of the prediction control unit 530.

The prediction control unit 530 includes the first database (DB) 610, the second database (DB)620, a database (DB) update unit 630, a type estimation unit 640, a location estimation unit 650, a movement prediction unit 660, and a selection unit 670.

(1) First Database

FIG. 7 is a diagram conceptually illustrating an example of a data structure of a table 700 included in the first database 610. The format of the first database 610 is not limited to the table format, but may be in another format.

The table 700 includes, as configuration items, a terminal identifier 710, a location 720, an antenna number 730, a beam number 740, and received power information 750. The configuration items are stored in the first database 610 including the table 700, in association with each other.

The terminal identifier 710 represents information identifying the terminal apparatus 100. The location 720 represents the location of the terminal apparatus 100. A map is divided into a plurality of grids, and an identifier (grid number) identifying the grid is assigned to each of the plurality of grids. In the present example, the location 720 is the grid number. In another example, the location 720 may be a coordinate on the map represented by latitude, longitude and height, etc.

The antenna number 730 represents an antenna number used for communication with terminal apparatus 100. The beam number 740 represents a beam number used for communication with terminal apparatus 100.

The received power information 750 is information (e.g., Reference Signal Received Power (RSRP)) representing a received power measured at the terminal apparatus 100 when the base station apparatus 200 transmits a downlink signal using a beam formed by the combination of the antenna number 730 and the beam number 740. The received power is measured using, for example, a synchronization signal or a reference signal. The synchronization signal may be, for example, Secondary Synchronization Signal (SSS) of New Radio (NR). The reference signal may be, for example, Channel State Information-Reference Signal (CSI-RS) or Physical Broadcast Channel-Demodulation Reference Signal (PBCH-DMRS) of NR. Instead of the received power, other information indicating a reception quality may be used. Such information may be Reference Signal Received Quality (RSRQ), Signal to Noise Ratio (SNR), Signal to Interference Ratio (SIR), or Signal to Interference plus Noise Ratio (SINR). In the Specification, the term "reception level" is defined as a concept including the received power and the reception quality.

As described above, the table 700 stores the relationship between the location, the communication parameter (i.e., the antenna number and the beam number), and the reception level (the received power or the reception quality).

In some cases, two or more received powers may be measured at the same location and for the same communication parameter. In this case, the received power information 750 may be a representative value calculated from the above two or more received powers. For example, the representative value may be an average or median value.

(2) Second Database

FIG. 8 is a diagram conceptually illustrating an example of a data structure of a table 800 included in the second database 620. The format of the second database 620 is not limited to the table format, but may be in another format.

The table 800 is a table generated based on the table 700. The table 800 includes, as configuration items, a type 810, a location 820, an antenna number 830, a beam number 840, and received power information 850. The configuration items are stored in the second database 620 including the table 800, in association with each other.

The type 810 represents a type of the terminal apparatus 100. The type of the terminal apparatus 100 is estimated by the type estimation unit 640. The method for estimating the type of the terminal apparatus 100 will be described later.

The type of the terminal apparatus 100 represents a type of a moving object that holds the terminal apparatus 100. For example, moving objects are classified into two or more types, taking into account their movement paths. For example, a pedestrian moves along a sidewalk, a motor vehicle moves along a roadway, and a train moves along a railroad track. Therefore, the moving areas of the pedestrian, motor vehicle and train are different from each other. The types may be set in consideration of the area where the object can move. For example, the types may include one or more of a pedestrian, a bicycle, a motor vehicle, a train, a bullet train, and an Unmanned Aerial Vehicle (UAV). The types may include other moving objects (e.g., a ship and an airplane). The Unmanned Aerial Vehicle may be referred to as "drone".

The ranges for movement speed of the pedestrian, motor vehicle and train are different from each other. Therefore, the types may be set considering the speed of movement. Therefore, the types may be set considering at least one of the area where the object can move, and the movement speed.

The type of the terminal apparatus 100 need not be managed using the name of the moving object. An identifier (type number) may be assigned to each of the types of the terminal apparatus 100.

In the following, for simplicity of explanation, the types include a first type, a second type, and a third type. The first type corresponds to the pedestrian, the second type corresponds to the motor vehicle, and the third type corresponds to the train.

The other configuration items of the table 800 (the location 820, the antenna number 830, the beam number 840, and the received power information 850) are the same as those in the table 700, and therefore, the description therefor is omitted.

As described above, the table 800 stores, for each of the types of the terminal apparatus 100, the relationship between the location, the communication parameter (i.e., the antenna number and the beam number), and the reception level. The prediction control unit 530 can, using the table 800, determine an appropriate communication parameter (including the antenna number and the beam number) in accordance with the type of the terminal apparatus 100.

In another example, the table 800 may be a table that summarizes the above data for each type and each location of the terminal apparatus 100. That is, the table 800 may be a table that associates a combination of a representative communication parameter and a received power with the type and location of the terminal apparatus 100. The combination of the representative communication parameter and the received power to be stored in the table 800 may be selected according to a predetermined criterion. The criterion may be a criterion that the received power is maximum. Here, the received power may be a value selected or calculated from data measured for the same type of the terminal apparatus 100, at the same location, and for the same antenna number and beam number. For example, the received power may be an average, minimum, or maximum value in data measured for the same type of the terminal apparatus 100, at the same location, and for the same antenna number and beam number.

(3) Update Unit

The update unit 630 updates the first database 610. Specifically, the update unit 630 acquires terminal information from the terminal apparatus 100. The terminal information includes the terminal identifier, the beam number, and the received power. The terminal apparatus 100 measures the received power using the synchronization signal or the reference signal in a situation in which the beamforming is performed, as described above. At this time, the terminal apparatus 100 can also acquire the beam number. The terminal apparatus 100 transmits the beam number and the received power together with the terminal identifier to the base station apparatus 200 as the terminal information.

Further, the update unit 630 acquires an estimated location of the terminal apparatus 100 from the location estimation unit 650 as described later. The update unit 630 acquires from the base station apparatus 200 the antenna number currently in use for the terminal apparatus 100.

The update unit 630 stores in the table 700 the terminal identifier, the location of the terminal apparatus 100, the antenna number, the beam number, and the received power in association with each other.

The terminal information may include information representing a Global Positioning System (GPS) signal indicating the location of the terminal apparatus 100. In another example, in a case in which the terminal apparatus 100 is capable of acquiring the antenna number, the terminal information may include the antenna number. In other examples, the update unit 630 may acquire from the base station apparatus 200 the antenna number and beam number currently in use for the terminal apparatus 100.

Furthermore, the update unit 630 updates the second database 620. The update unit 630 classifies the information contained in the table 700 by the type of the terminal apparatus 100, and aggregates it into the table 800. Specifically, the update unit 630 acquires a record from the table 700. The record includes the terminal identifier 710, the location 720, the antenna number 730, the beam number 740, and the received power information 750, as described above. The update unit 630 acquires from the type estimation unit 640 the type of the terminal apparatus 100 corresponding to the terminal identifier 710.

The update unit 630 associates the type of the terminal apparatus 100, the location 720, the antenna number 730, the beam number 740, and the received power information 750 with each other, and stores them in the table 800.

In some cases, two or more received powers may be measured for the same type, at the same location and for the same communication parameter. In this case, the received power information 850 may be a representative value calculated from the above two or more received powers. For example, the representative value may be an average or median value.

(4) Type Estimation Unit

The type estimation unit 640 estimates the type of the terminal apparatus 100. The type estimation unit 640 estimates the type of the terminal apparatus 100 based on any one or a combination of two or more of the following: the estimated location of the terminal apparatus 100, time-series information of the estimated location of the terminal apparatus 100, map information, the movement speed of the terminal apparatus 100, and the image acquired by the camera.

In one example, the type estimation unit 640 acquires the estimated location of the terminal apparatus 100 and the time-series information of the estimated location of the terminal apparatus 100 from the location estimation unit 650 described later or the table 700. Furthermore, the storing unit 222 stores two-dimensional or three-dimensional map information. The map information includes information on the locations and sizes of sidewalks, roadways, railroad tracks, and buildings.

Since the area where the pedestrian can move, the area where the motor vehicle can move and the area where the train can move are different from each other as described above, the type estimation unit 640 determines the type of the terminal apparatus 100 based on the estimated location of the terminal apparatus 100, the time series information of the estimated location of the terminal apparatus 100, and the map information. For example, in a case in which the terminal apparatus 100 is on a sidewalk, the type estimation unit 640 determines that the type of the terminal apparatus 100 is the first type. In a case in which the terminal apparatus 100 is on a roadway, the type estimation unit 640 determines that the type of the terminal apparatus 100 is the second type. In a case in which the terminal apparatus 100 is on a railroad track, the type estimation unit 640 determines that the type of the terminal apparatus 100 is the third type.

In another example, the type estimation unit 640 may acquire the movement speed of the terminal apparatus 100 from the movement prediction unit 660. The type estimation unit 640 may calculate the movement speed of the terminal apparatus 100 based on the time-series information of the estimated location of the terminal apparatus 100. The type estimation unit 640 may estimate the type of the terminal apparatus 100 by further considering the movement speed of the terminal apparatus 100.

In another example, the type estimation unit 640 may estimate the type of the terminal apparatus 100 using the camera mounted on each of the plurality of base station antennas 210. As described above, the camera captures an image of the area corresponding to the beam steering range. The type estimation unit 640 estimates the type of the terminal apparatus 100 based on the estimated location of the terminal apparatus 100 and the image acquired by the camera. The type estimation unit 640 may perform prescribed image analysis processing (e.g., pattern matching) on the image to estimate the type of the terminal apparatus 100.

In another example, the type estimation unit 640 may estimate the type of the terminal apparatus 100 by clustering (unsupervised learning) using any one or two or more of the estimated location of the terminal apparatus 100, the time-series information of the estimated location of the terminal apparatus 100, and the movement speed of the terminal apparatus 100.

In another example, the type estimation unit 640 may pre-set candidates of the type of the terminal apparatus 100 for each of respective areas where the plurality of base station antennas 210 are installed, or for each area on the map (e.g., for each one or more grids). For example, the type estimation unit 640 may pre-set a “set of selectable types” for each area on the map. The type estimation unit 640 may select the type of the terminal apparatus 100 from the set of selectable types using the movement speed of the terminal apparatus 100.

For example, it is assumed that a first region on the map includes only a sidewalk and a roadway. In this case, moving objects included in the first region include only pedestrians and motor vehicles. Therefore, the type estimation unit 640 pre-sets the first type (pedestrian) and the second type (motor vehicle) as a set of selectable types in the first region.

It is assumed that a second region on the map includes only a roadway and a railroad track. In this case, moving objects included in the second region include only motor vehicles and trains. Therefore, the type estimation unit 640 pre-sets the second type (motor vehicle) and the third type (train) as a set of selectable types in the second region. According to this configuration, the type estimation unit 640 selects the type of the terminal apparatus 100 from the set of selectable types. This allows for increased accuracy in estimating the type of the terminal apparatus 100.

The set of selectable types may be set by input operations through a predetermined external interface (input devices such as a keyboard and a mouse). In another example, the type estimation unit 640 may set the set of selectable types using the camera mounted on each of the plurality of base station antennas 210-1, 210-2, . . . , and 210-N. The type estimation unit 640 may set the set of selectable types by performing image analysis processing on the images acquired by the camera in real time. The type estimation unit 640 may accumulate images acquired by the camera for a certain period of time, perform the image analysis processing on the accumulated images, and set the set of selectable types.

The type estimation unit 640 may periodically or non-periodically perform the above image analysis processing to change the set of selectable types. In a case in which a sidewalk and a roadway are newly built due to construction or other reasons, the type estimation unit 640 can add necessary types to the set of selectable types.

(5) Location Estimation Unit

The location estimation unit 650 estimates the location of the terminal apparatus 100. For example, the location estimation unit 650 may estimate the location of the terminal apparatus 100 using ranging and the beam direction of the single antenna 230 communicating with the terminal apparatus 100. Examples of ranging include a method using propagation time such as Round-Trip Time (RRT), and a method for calculating a distance to the terminal apparatus 100 from the reception level based on a propagation model.

In another example, the location estimation unit 650 may estimate the location of the terminal apparatus 100 by a three-point positioning method using the plurality of base station antennas 210.

In another example, the storing unit 222 may store in advance information representing a relationship between the respective reception levels at the plurality of antennas 230 and the location of the terminal apparatus 100 (hereinafter referred to as "location-related information"). The location estimation unit 650 may estimate the location of the terminal apparatus 100 from the respective reception levels at the plurality of antennas 230 based on the location-related information.

In another example, the location estimation unit 650 may combine two or more of the above methods to estimate the location of the terminal apparatus 100. For example, the location estimation unit 650 may use the beam direction and the ranging to acquire a range in which the terminal apparatus 100 may be included, and estimate the location of the terminal apparatus 100 within the acquired range, based on the location-related information.

In another example, the location estimation unit 650 may acquire information representing the location of the terminal apparatus 100 from an external device (e.g., the terminal apparatus 100). The location estimation unit 650 may obtain from the terminal apparatus 100 information representing a GPS signal indicating the location of the terminal apparatus 100. In a further other example, the location estimation unit 650 may acquire from the terminal apparatus 100 information representing measurement values from other sensors mounted on the terminal apparatus 100 (e.g., an accelerometer) to estimate the location of the terminal apparatus 100.

(6) Movement Prediction Unit

The movement prediction unit 660 acquires the time-series information on the estimated location of the terminal apparatus 100 from the location estimation unit 650 or the table 700.

In another example, the movement prediction unit 660 acquires the estimated location of the terminal apparatus 100 from the location estimation unit 650, and accumulates the estimated location for a predetermined period of time. In this manner, the movement prediction unit 660 may generate the time-series information of the estimated location of the terminal apparatus 100.

The movement prediction unit 660 performs interpolation processing by extrapolation (e.g., linear interpolation processing) based on the time-series information of the estimated location of the terminal apparatus 100, and predicts the location of the terminal apparatus 100 after a predetermined time Tm. The location predicted in this manner is referred to hereinafter as "future location Pf of the terminal apparatus 100".

In another example, the movement prediction unit 660 may determine the direction and speed of movement of the terminal apparatus 100 based on the type of the terminal apparatus 100, and predict the future location Pf of the terminal apparatus 100. For this processing, the movement prediction unit 660 may predict the future location Pf of the terminal apparatus 100 using a first movement prediction model. For example, the first movement prediction model is a model for predicting the movement speed and movement direction in accordance with the type of the terminal apparatus 100. The movement prediction unit 660 acquires the type of the terminal apparatus 100 from the type estimation unit 640, and acquires the estimated location of the terminal apparatus 100 from the location estimation unit 650. The movement prediction unit 660 applies the type of the terminal apparatus 100 and the estimated location of the terminal apparatus 100 to the first movement prediction model. This allows the movement prediction unit 660 to accurately predict the future location Pf of the terminal apparatus 100.

The movement prediction unit 660 may determine the movement direction and movement speed of the terminal apparatus 100 based on the type of the terminal apparatus 100 and the map information to predict the future location Pf of the terminal apparatus 100. As described above, the map information includes information representing the movement paths (e.g., sidewalks, roadways, and railroad tracks) of various moving objects. By using the map information, the movement prediction unit 660 can accurately predict the future location Pf of the terminal apparatus 100. The movement prediction unit 660 may predict the future location Pf of the terminal apparatus 100 using a second movement prediction model. The second movement prediction model is a model for predicting the movement speed and movement direction in accordance with the type of the terminal apparatus 100, and is generated based on the type of the terminal apparatus 100 and the map information.

The movement prediction unit 660 may predict the future location Pf of the terminal apparatus 100 using a third movement prediction model. The third movement prediction model is a model for predicting the movement speed and movement direction in accordance with the type of the terminal apparatus 100, and is generated from a past movement history of the terminal apparatus 100. For example, the movement prediction unit 660 accumulates the past movement history of the terminal apparatus 100 for each type. The movement prediction unit 660 may learn such a movement history by machine learning to generate the third movement prediction model.

(7) Selection Unit

The selection unit 670 acquires the future location Pf of the terminal apparatus 100 from the movement prediction unit 660. The selection unit 670 acquires the type of the terminal apparatus 100 from the type estimation unit 640.

The selection unit 670 estimates a received power of a radio signal at the future location Pf for each of a plurality of communication parameters (each including the antenna number and the beam number) based on the type of the terminal apparatus 100. Then, the selection unit 670 determines the communication parameter to be used for the terminal apparatus 100 at the future location Pf based on the estimated received power.

In the following, for the sake of simplicity of description, the communication parameter finally determined by the selection unit 670 (i.e., the communication parameter to be used for the terminal apparatus 100 at the future location Pf) will be referred to as "communication parameter prf".

Specifically, the selection unit 670 estimates the received power of the radio signal at the future location Pf for each of the plurality of communication parameters by referring to the table 800.

It is assumed that the type of the terminal apparatus 100 is the first type and the future location Pf is P1. In this case, the selection unit 670 refers to, in the table 800, a plurality of records in which the type 810 is the first type and the location 820 is P1. In the example in FIG. 8, there are three records that satisfy this condition. The selection unit 670 selects a record with the highest received power information 850 among the three records. Here, Pw4>Pw3>Pw2. Therefore, the selection unit 670 selects a record of which the received power information 850 is "Pw4". In the selected record, the antenna number is An1 and the beam number is Bm1. Therefore, the selected communication parameter is the combination of An1 and Bm1.

The communication parameter selected above is a candidate of the communication parameter prf to be used for the terminal apparatus 100 at the future location Pf. Hereinafter, the communication parameter selected from the table 800 in this manner is referred to as "first parameter pr1".

If there is no record in the table 800 in which the location 820 is P1, the selection unit 670 may refer to a record in which the type 810 is the first type and the location 820 is closest to P1 (e.g., P3).

The selection unit 670 acquires the communication parameter (including the antenna number and the beam number) currently in use for the terminal apparatus 100. Hereinafter, the communication parameter acquired in this manner is referred to as "second parameter pr2".

The selection unit 670 compares the first parameter pr1 with the second parameter pr2, and determines the communication parameter prf using a result of the comparison. In a case in which the first parameter pr1 and the second parameter pr2 are the same, the selection unit 670 determines the second parameter pr2 as the communication parameter prf. That is, the selection unit 670 maintains the current communication parameter (i.e., the second parameter pr2).

Meanwhile, in a case in which the first parameter pr1 and the second parameter pr2 are different, the selection unit 670 may determine the first parameter pr1 as the communication parameter prf.

In another example, the selection unit 670 may determine the communication parameter prf according to Case 1 and Case 2 below.

Case 1: The antenna number of the first parameter pr1 is the same as the antenna number of the second parameter pr2, and the beam number of the first parameter pr1 is different from the beam number of the second parameter pr2.

Case 2: The antenna number of the first parameter pr1 is different from the antenna number of the second parameter pr2.

Regarding Case 1

The selection unit 670 may determine the first parameter pr1 as the communication parameter prf.

In a case in which the antenna configuration corresponding to the antenna number includes a plurality of subarrays, the selection unit 670 may determine two of the first parameter pr1 and the second parameter pr2 as the communication parameters prf. In this case, the beam control unit 213 uses the plurality of subarrays to form two beams, that is, one beam corresponding to the beam number of the first parameter pr1 and the other beam corresponding to the beam number of the second parameter pr2.

In another example, the selection unit 670 may determine the communication parameter prf based on a relationship between an estimated received power in the case of the first parameter pr1, a received power in the case of the second parameter pr2, and a threshold Pwth. Here, the estimated received power in the case of the first parameter pr1 is the value of the received power information 850 in the table 800. The received power in the case of the second parameter pr2 is the current received power (received power acquired from the terminal information of the terminal apparatus 100 at the present time).

Figure 9:
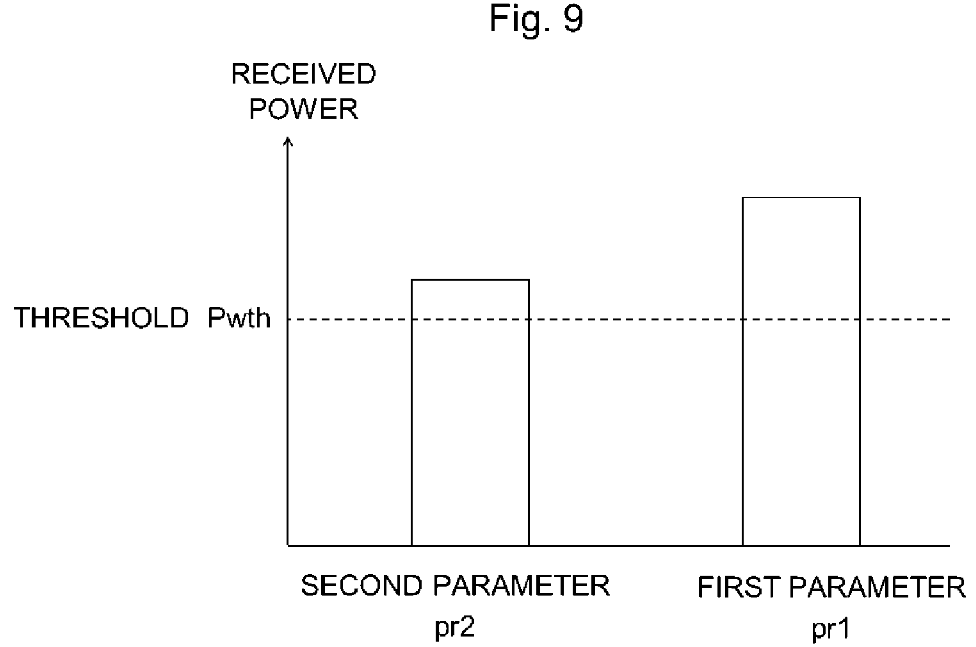
FIG. 9 is a diagram for explaining an example of an operation of a selection unit.

FIG. 9 is a diagram for explaining an example of an operation of the selection unit 670. Both the estimated received power in the case of the first parameter pr1 and the current received power in the case of the second parameter pr2 are equal to or greater than the threshold Pwth. In this case, there is less need to change the current communication parameter (second parameter pr2). Therefore, the selection unit 670 determines the second parameter pr2 as the communication parameter prf.

Figure 10:
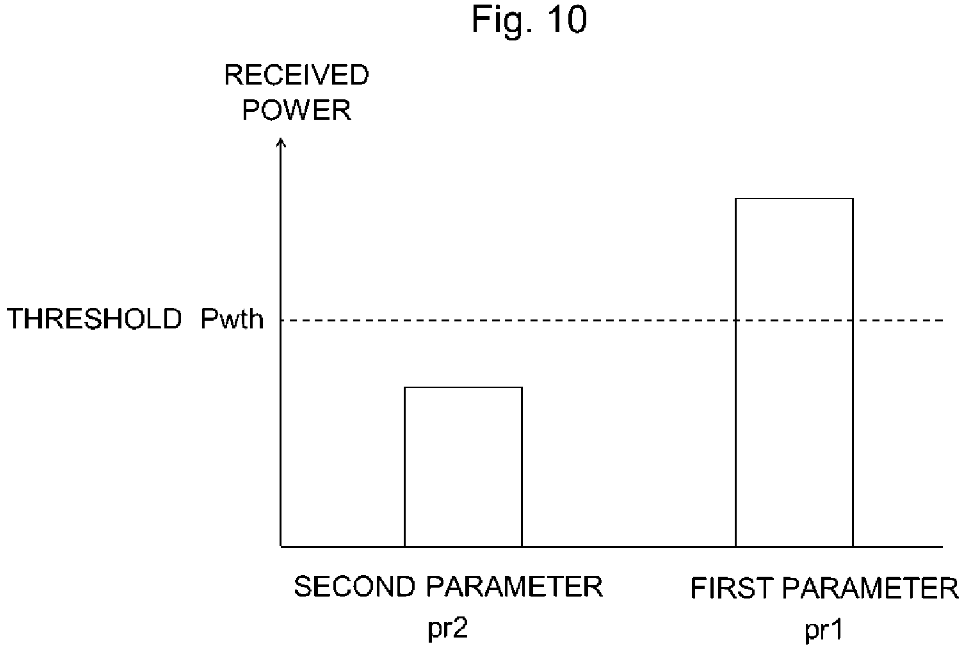
FIG. 10 is a diagram for explaining an example of an operation of the selection unit.

FIG. 10 is a diagram for explaining an example of an operation of the selection unit 670. The current received power in the case of the second parameter pr2 is less than the threshold Pwth, and the estimated received power in the case of the first parameter pr1 is equal to or greater than the threshold Pwth. In this case, the selection unit 670 determines the first parameter pr1 as the communication parameter prf.

Figure 11:
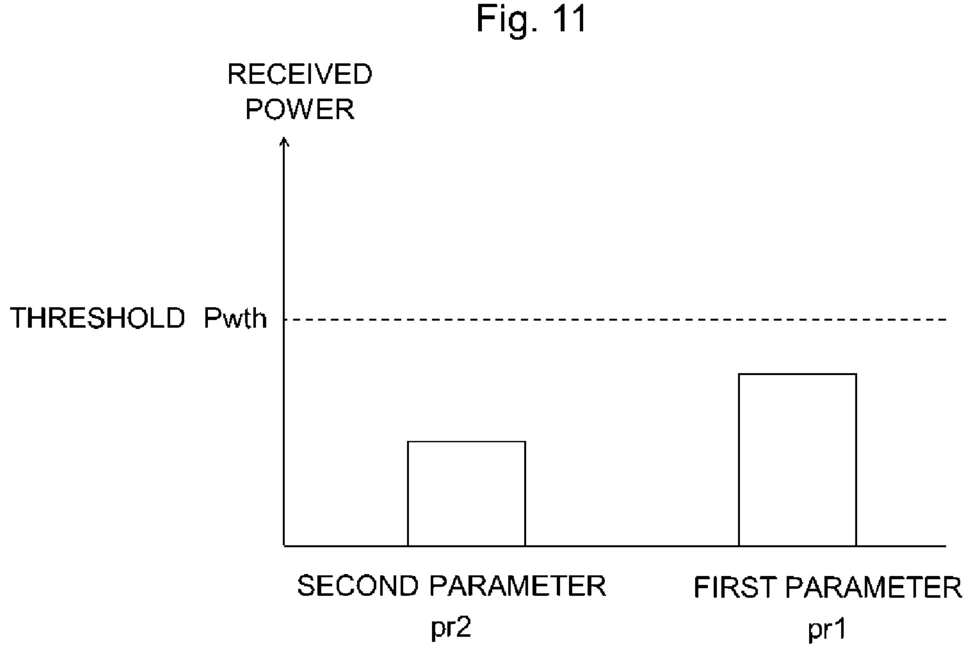
FIG. 11 is a diagram for explaining an example of an operation of the selection unit.

FIG. 11 is a diagram for explaining an example of an operation of the selection unit 670. Both the estimated received power in the case of the first parameter pr1 and the current received power in the case of the second parameter pr2 are less than the threshold Pwth. However, the estimated received power in the case of the first parameter pr1 is greater than the current received power in the case of the second parameter pr2. In this case, the selection unit 670 may determine the first parameter pr1 as the communication parameter prf. Alternatively, the selection unit 670 may determine two of the first parameter pr1 and the second parameter pr2 as the communication parameters prf.

Regarding Case 2

The selection unit 670 may determine the first parameter pr1 as the communication parameter prf. Alternatively, the selection unit 670 may determine two of the first parameter pr1 and the second parameter pr2 as the communication parameters prf.

In another example, the selection unit 670 may refer to the table 800, and select, as a third parameter pr3, a communication parameter including the same antenna number 830 as the antenna number of the second parameter pr2. In a case in which an estimated received power (corresponding to the received power information 850) in the case of the third parameter pr3 is equal to or greater than the threshold Pwth, the selection unit 670 may determine the third parameter pr3 as the communication parameter prf. According to this configuration, the antenna number can be prevented from being changed frequently. In a case in which the estimated received power in the case of the third parameter pr3 is less than the threshold Pwth, the selection unit 670 may determine the first parameter pr1 as the communication parameter prf.

2-7. Flow of Processing

Figure 12:
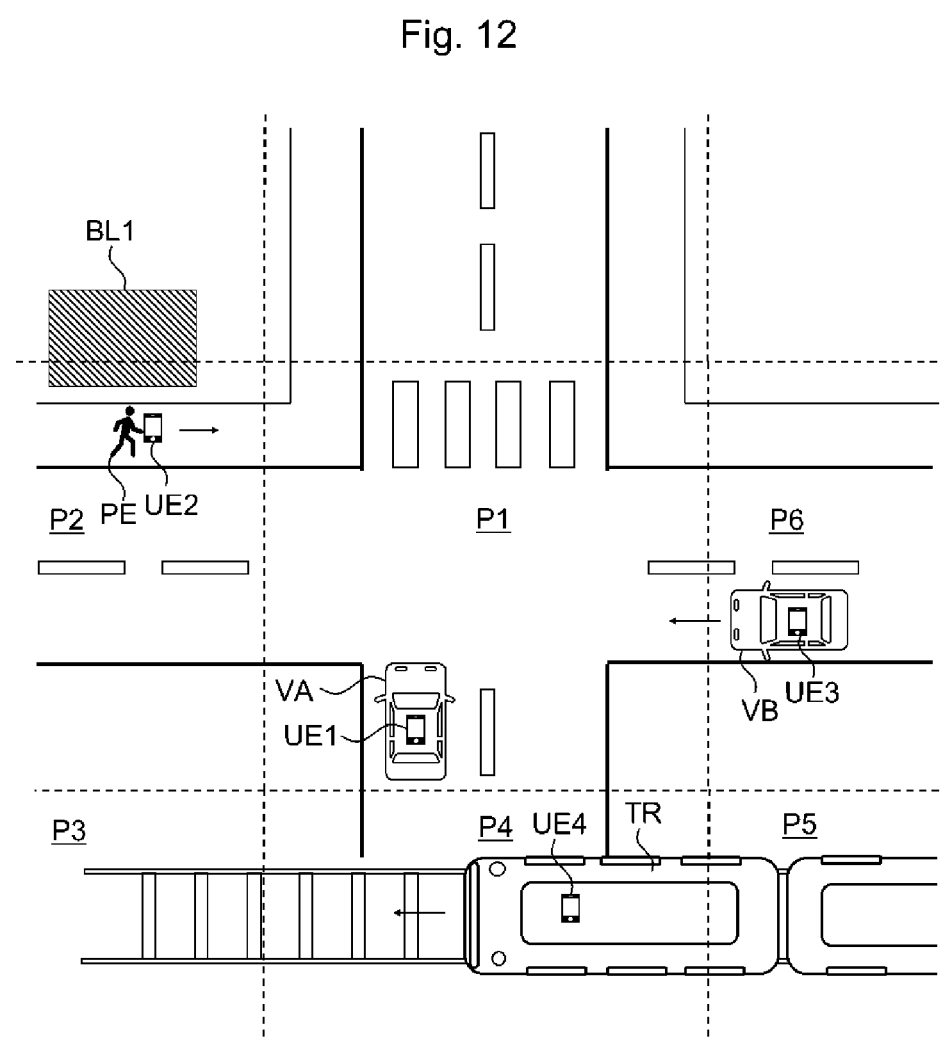

Next, the operation of each component in the prediction control unit 530 will be described with reference to FIGS. 12 to 15. FIG. 12 is a diagram illustrating a situation in which a plurality of terminal apparatuses UE1 to UE4 are moving. In the following, the operation of each component in the prediction control unit 530 will be described using the example in FIG. 12.

Figure 13:
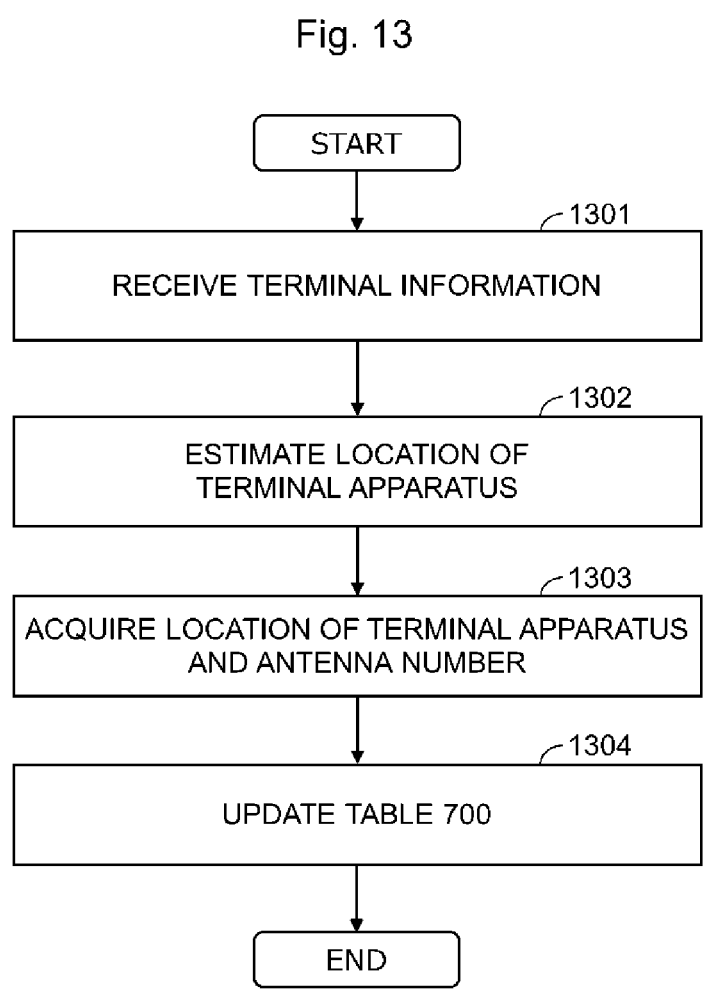

FIG. 13 is a flowchart for illustrating an example of a flow of processing for updating the first database 610 (the table 700).

As shown in FIG. 12, the terminal apparatus UE1 is in a motor vehicle VA. The terminal apparatus UE1 is present at a location P1.

The update unit 630 receives the terminal information from the terminal apparatus UE1 (1301). The terminal information includes the following information:

Terminal identifier: UE1

Beam number: Bm1

Received power: Pw1

The location estimation unit 650 estimates the location of the terminal apparatus UE1 (1302). The location estimation unit 650 estimates that the terminal apparatus UE1 is present at the location P1.

The update unit 630 acquires the estimated location (in this example, P1) of the terminal apparatus UE1 from the location estimation unit 650 (1303). Further, the update unit 630 acquires from the radio resource control unit 520 the antenna number (An1) currently in use for the terminal apparatus UE1 (1303).

The update unit 630 updates the table 700 (1304). The update unit 630 adds to the table 700 a record with the following configuration items.

Terminal identifier 710: UE1

Location 720: P1

Antenna number 730: An1

Beam number 740: Bm1

Received power information 750: Pw1

The update unit 630 executes the flowchart in FIG. 13 each time a predetermined period of time passes, and accumulates a large number of records in the table 700. That is, the update unit 630 accumulates in the table 700 the relationship between the location, the communication parameter (i.e., the antenna number and the beam number), and the received power.

FIG. 14 is a flowchart for illustrating an example of a flow of processing for updating the second database 620 (the table 800).

The update unit 630 acquires from the table 700 a record corresponding to the terminal apparatus UE1 (the terminal identifier 710=UE1) (1401). In this example, the update unit 630 acquires the following information:

Terminal identifier 710: UE1

Location 720: P1

Antenna Number 730: An1

Beam number 740: Bm1

Received power information 750: Pw1

The type estimation unit 640 estimates the type of the terminal apparatus UE1 (1402). In the example in FIG. 12, the terminal apparatus UE1 is on a roadway, and therefore, the type estimation unit 640 estimates the type of the terminal apparatus UE1 to be the second type (motor vehicle).

The update unit 630 acquires the type of the terminal apparatus UE1 from the type estimation unit 640 (1403).

The update unit 630 updates the table 800 (1404). The update unit 630 adds to the table 800 a record with the following configuration items:

Type 810: Second type

Location 820: P1

Antenna number 830: An1

Beam number 840: Bm1

Received power: Pw1

The update unit 630 executes the flowchart in FIG. 14 each time a predetermined period of time passes, and accumulates a large number of records in the table 800. That is, the update unit 630 accumulates in the table 800 the relationship between the type of the terminal apparatus 100, the location, the communication parameter (i.e., the combination of the antenna number and the beam number), and the received power.

FIG. 15 is a flowchart for illustrating an example of a flow of processing for determining the communication parameter prf to be used for the terminal apparatus 100 at the future location Pf.

In the example in FIG. 12, the terminal apparatus UE2 is at a location P2. The terminal apparatus UE2 is held by a pedestrian PE. The terminal apparatus UE2 is about to enter the location P1.

The selection unit 670 receives the terminal information of the terminal apparatus UE2 (1501). The terminal information includes the following information:

Terminal identifier: UE2

Beam number: Bm2

Received power: Pw1

The location estimation unit 650 estimates the location of the terminal apparatus UE2 (1502). The location estimation unit 650 estimates that the terminal apparatus UE2 is at the location P2. The selection unit 670 acquires the estimated location (P2) of the terminal apparatus UE2 from the location estimation unit 650.

The movement prediction unit 660 predicts the future location Pf of the terminal apparatus UE2 (1503). The movement prediction unit 660 predicts that the terminal apparatus UE2 will enter the location P1. That is, the future location Pf is P1.

The type estimation unit 640 estimates the type of the terminal apparatus UE2 (1504). The type estimation unit 640 estimates the type of the terminal apparatus UE2 to be the first type (pedestrian). The selection unit 670 acquires the type of the terminal apparatus UE2 (first type) from the type estimation unit 640.

The selection unit 670 refers to the table 800 based on the type and future location Pf of the terminal apparatus UE2 (1505). The selection unit 670 refers to, in the table 800, a plurality of records in which the type 810 is the first type and the location 820 is P1. In the example in FIG. 8, there are three records that satisfy this condition. The selection unit 670 selects a record with the highest received power information 850 from among the three records. According to the assumption above, Pw4>Pw3>Pw2. The selection unit 670 selects a record of which the received power information 850 is "Pw4". Therefore, the selected communication parameter (i.e., the first parameter pr1) is the combination of An1 and Bm1.

The selection unit 670 determines the communication parameter prf (1506).

For example, it is assumed that, in the current situation in which the terminal apparatus UE2 is present at the location P2, the antenna number, the beam number and the received power are as follows:

Antenna number An1

Beam number: Bm2

Received power: Pw1

Therefore, the second parameter pr2 is the combination of An1 and Bm2. The current case corresponds to Case 1 above. Furthermore, it is assumed that Pw1<Pwth<Pw4. As explained in FIG. 10, the selection unit 670 determines the first parameter pr1 (the combination of An1 and Bm1) as the communication parameter prf. The selection unit 670 transmits the communication parameter prf to the radio resource control unit 520.

2-8. Effects

The configuration described above provides the following effects. The base station apparatus 200 can control radio communication with the terminal apparatus 100 in accordance with the movement situation of the terminal apparatus 100.

In the example in FIG. 12, the terminal apparatus UE2 is held by the pedestrian PE, and the terminal apparatus UE3 is in a motor vehicle VB. The pedestrian PE and the motor vehicle VB are about to enter the same location P1. The movement path and movement speed of the pedestrian PE, and the movement path and movement speed of the motor vehicle VB are different from each other. Therefore, the communication parameter suitable for the terminal apparatus UE2 at the location P1 may differ from the communication parameter suitable for the terminal apparatus UE3 at the location P1.

The base station apparatus 200 determines the communication parameter prf in accordance with the estimated type. The base station apparatus 200 can separately determine the communication parameter prf to be used for the terminal apparatus UE2 and the communication parameter prf to be used for the terminal apparatus UE3 with respect to the same future location P1. In this way, the base station apparatus 200 can determine the communication parameter prf, taking into account each individual situation and environment of the moving object. Accordingly, the communication quality between the base station apparatus 200 and the terminal apparatus UE2, and the communication quality between the base station apparatus 200 and the terminal apparatus UE3 can be stabilized on a case-by-case basis.

Furthermore, in the example in FIG. 12, the terminal apparatus UE4 is located inside a train TR. Although radio waves from the base station apparatus 200 can penetrate into the train TR through side windows of the train TR, it is difficult for radio waves to penetrate into the train TR from the front or rear of the train TR. For this situation, the table 800 stores the relationship between the location, the communication parameter (i.e., the combination of the antenna number and the beam number), and the received power for each type of the terminal apparatus 100. The base station apparatus 200 can determine the communication parameter prf appropriate for the train (third type) by referring to the table 800. For example, the base station apparatus 200 can determine the communication parameter prf such that radio waves can penetrate through the side windows of the train TR. In this way, the base station apparatus 200 can determine the communication parameter prf suitable for each type, which contributes to stabilization of the communication quality.

The environment for communication depends on the location of the terminal apparatus 100. For example, when the pedestrian PE is at the location P2, there is an obstacle (building BL1) near the terminal apparatus UE2. On the other hand, when terminal apparatus UE2 reaches the location P1, no obstacle exists near the terminal apparatus UE2. Therefore, the communication parameter suitable for the situation in which the terminal apparatus UE2 is at the location P2 may be different from the communication parameter suitable for the situation in which the terminal apparatus UE2 is at the location P1. The base station apparatus 200 can determine the communication parameter prf according to changes in the location of the terminal apparatus UE2 (i.e., changes in the environment around the terminal apparatus UE2).

2-9. Example Alterations

The technique related to the present disclosure is not limited to the example embodiment described above.

(1) First Example Alteration

The communication parameter is not limited to the combination of the antenna number and the beam number. The communication parameter may include only the beam number. In this configuration, the antenna number 730 is omitted from the table 700, and the antenna number 830 is omitted from the table 800. The selection unit 670 determines the beam number as the communication parameter prf to be used for the terminal apparatus 100 at the future location Pf.

The communication parameter may include only the antenna number. In this configuration, the beam number 740 is omitted from the table 700, and the beam number 840 is omitted from the table 800. The selection unit 670 determines the antenna number as the communication parameter prf to be used for the terminal apparatus 100 at the future location Pf.

(2) Second Example Alteration

The configurations of the first database 610 and the second database 620 are not limited to the above examples, respectively. The first database 610 may further include at least one of a movement direction, a movement speed, and a time as configuration items. The second database 620 may further include at least one of a movement direction, a movement speed and a time as configuration items.

FIG. 16 conceptually illustrates an example of a data structure of a table 1600 included in the first database 610. The table 1600 includes, as configuration items, the terminal identifier 710, the location 720, the antenna number 730, the beam number 740, the received power information 750, and a time 760. The configuration items are stored in the first database 610 including the table 1600, in association with each other.

FIG. 17 conceptually illustrates an example of a data structure of a table 1700 included in the second database 620. The table 1700 includes, as configuration items, the type 810, the location 820, the antenna number 830, the beam number 840, the received power information 850, and a time 860. The configuration items are stored in the second database 620 including the table 1700, in association with each other.

The update unit 630 may delete old records from the table 1600 based on the time 760 to thereby reduce the amount of information. The update unit 630 may delete old records from the table 1700 based on the time 860 to thereby reduce the amount of information.

The update unit 630 may select only relatively new records in the table 1600 based on the time 760, and aggregate the selected records into the table 1700. For example, new roads and buildings are constructed, and therefore, the environment may be changed. The above configuration is advantageous in such a case. The update unit 630 can generate and update the table 1700 based on the recent environment. The selection unit 670 can determine the communication parameter prf based on the recent environment.

Furthermore, the table 1600 may further include a movement direction as a configuration item. The table 1700 may further include a movement direction as a configuration item. In the example in FIG. 12, the movement direction of the motor vehicle VA and the movement direction of the motor vehicle VB are different from each other. The communication parameter suitable for the situation in which the terminal apparatus UE1 is at the location P1 may be different from the communication parameter suitable for the situation in which the terminal apparatus UE3 reaches the location P1.

The base station apparatus 200 can determine the communication parameter prf in accordance with the movement direction. Similarly, the base station apparatus 200 may determine the communication parameter prf further considering the movement speed.

(3) Third Example Alteration

The first database 610 may include other tables instead of or in addition to the table 700. FIG. 18 conceptually illustrates an example of a data structure of a table 1800 included in the first database 610.

The table 1800 includes, as configuration items, a terminal identifier 1810, a location 1820, an antenna number 1830, a beam number 1840, and received power information 1850. The configuration items are stored in the first database 610 including the table 1800, in association with each other. The terminal identifier 1810, the location 1820, the antenna number 1830, and the beam number 1840 are the same as the configuration items in the table 700, and therefore, the description therefor is omitted. The received power information 1850 is information representing a received power measured at the base station apparatus 200 when the base station apparatus 200 receives an uplink signal by the beam formed by the combination of the antenna number 1830 and the beam number 1840. The received power is measured, for example, using a reference signal transmitted from the terminal apparatus 100. The reference signal is, for example, a sounding reference signal (SRS).

FIG. 19 conceptually illustrates an example of a data structure of a table 1900 included in the second database 620. The table 1900 includes, as configuration items, the type 810, the location 820, the antenna number 830, the beam number 840, the received power information 850, and a link 870. The configuration items are stored in the second database 620 including the table 1900, in association with each other. The link 870 represents whether the received power information 850 is a received power measured on the downlink (the received power information 750 in the table 700) or a received power measured on the uplink (i.e., the received power information 1850 in the table 1800).

The update unit 630 may update the table 1900 based on the table 700 and the table 1800. The selection unit 670 may refer to the table 1900, consider both the received power measured on the downlink and the received power measured on the uplink, and determine the communication parameter prf.

(4) Fourth Example Alteration

The selection unit 670 may estimate the reception level (received power or reception quality) of the radio signal at the future location Pf for each of the plurality of communication parameters based on radio propagation prediction. For example, the selection unit 670 may use the map information to perform propagation simulation by ray tracing. As described above, the map information includes information on the locations and sizes of sidewalks, roadways, railroad tracks, and buildings. The selection unit 670 performs the propagation simulation on the map for each type of the terminal apparatus 100, and estimates the reception level of the radio signal at the future location Pf for each of the plurality of communication parameters.

For the above configuration, the selection unit 670 generates a radio propagation prediction model in advance for each type of the terminal apparatus 100. Depending on the type of the terminal apparatus 100, characteristics of radio wave propagation with respect to the surrounding environment differ. As mentioned above, if the terminal apparatus 100 is present in a train, radio waves cannot enter the train from a specific direction (from the front or rear of the train). Therefore, the radio propagation prediction model may be generated by considering the loss of penetration of radio waves from the specific direction, and the like.

The selection unit 670 may perform the propagation simulation in real time. In another example, the selection unit 670 may perform the propagation simulation in advance, and store a simulated received power in the received power information 850 of the table 800. The selection unit 670 can refer to the table 800 to estimate the received power of the radio signal at the future location Pf for each of the plurality of communication parameters. Then, the selection unit 670 can determine the communication parameter prf.

The selection unit 670 may use both the table 800 and the propagation simulation. For example, the selection unit 670 may use the propagation simulation to estimate received powers corresponding to the communication parameters that are not present in the table 800. This configuration is advantageous in a case in which a sufficient amount of information has not been stored in the table 800.

(5) Fifth Example Alteration

The selection unit 670 may evaluate the accuracy of the received power information 850 of the table 800. For example, the selection unit 670 compares the received power information 850 in the table 800 with a received power measured when the terminal apparatus 100 actually reaches the future location Pf (hereinafter referred to as "actual received power") for the same communication parameter. Specifically, the selection unit 670 calculates an error between the received power information 850 in the table 800 and the actual received power.

In a case in which the error is less than or equal to a predetermined error threshold Eth, the selection unit 670 determines that the estimation accuracy of the received power information 850 in the table 800 is high. In this case, the selection unit 670 permits the terminal apparatus 100 to change the communication parameter currently in use.

Meanwhile, the environment at the time the records have been added to the table 800 may be significantly different from the current environment. For example, a barrier may be temporarily present. An example of such a case is when a motor vehicle is temporarily parked in a roadway. In such a case, the above error becomes greater than the predetermined error threshold Eth. The selection unit 670 determines that the estimation accuracy of the received power information 850 in the table 800 is low. The selection unit 670 maintains the communication parameter currently in use for the terminal apparatus 100 (i.e., the second parameter pr2).

In another example, the selection unit 670 may determine two of the first parameter pr1 and the second parameter pr2 as the communication parameters prf, in accordance with the accuracy of the received power information 850 in the table 800. In this configuration, the beam control unit 213 performs the beamforming with the first parameter pr1 and the beamforming with the second parameter pr2. According to this configuration, the redundancy is increased, and therefore, the connection between the base station apparatus 200 and the terminal apparatus 100 can be stabilized.

(6) Sixth Example Alteration

The selection unit 670 may determine three or more communication parameters as communication parameters prf. In the example in FIG. 11, both the estimated received power for the first parameter pr1 and the received power for the second parameter pr2 are less than the threshold Pwth. In such a case, the selection unit 670 may select the communication parameter with the second highest received power from the table 800 as an additional communication parameter. The selection unit 670 may determine the first parameter pr1, the second parameter pr2 and the above additional communication parameter as the communication parameters prf. According to this configuration, the degree of redundancy is increased, and therefore, the connection between the base station apparatus 200 and the terminal apparatus 100 can be stabilized.

(7) Seventh Example Alteration

In a case in which the base station apparatus 200 performs radio communication with the terminal apparatus 100 using two or more communication parameters, the throughput of the system is limited. In consideration of this, the selection unit 670 may acquire information on the utilization rate of radio resource from the radio resource control unit 520. The selection unit 670 may determine two or more communication parameters as the communication parameters prf only when the utilization rate of radio resource is less than a predetermined utilization rate threshold Uth.

(8) Eighth Example Alteration

The movement prediction unit 660 may predict a plurality of future locations Pf. The selection unit 670 refers to the table 800 for each of the plurality of future locations Pf. The selection unit 670 may determine the communication parameter prf such that the terminal apparatus 100 satisfies a predetermined condition in the process of passing through the plurality of future locations Pf. The predetermined condition may be a condition that the number of times the antenna number is changed in the above process is less than or equal to a predetermined number-of-times threshold Cth. According to this configuration, it is possible to prevent the antenna number from being changed frequently. This contributes to stabilization of communication quality.

For example, the selection unit 670 extracts communication parameters including the antenna number of the second parameter pr2 for each of the plurality of future locations Pf. At this time, the selection unit 670 may extract only communication parameters for which the received power information 850 is greater than or equal to a predetermined received power. The selection unit 670 may determine the communication parameter prf from among the extracted communication parameters. According to this configuration, the antenna number is maintained unchanged in the process of the terminal apparatus 100 passing through the plurality of future locations Pf.

(9) Ninth Example Alteration

The movement prediction unit 660 may determine the accuracy of the future location Pf. For example, if the number of estimated locations of the terminal apparatus 100 is small, the accuracy of interpolation by extrapolation may be low. In such a case, the movement prediction unit 660 may determine that the accuracy of the future location Pf is low. Similarly, the location estimation unit 650 may determine the accuracy of the estimated location of the terminal apparatus 100.

In a case in which the accuracy of the estimated position of the terminal apparatus 100 or the accuracy of the future location Pf is determined to be low, the selection unit 670 may select a fourth parameter pr4, which is a candidate of the communication parameter prf, for each of two or more locations around the future location Pf. Similar to the case of selecting the first parameter pr1, the selection unit 670 selects, as the fourth parameter pr4, the communication parameter corresponding to a record with the highest received power information 850.

The selection unit 670 may compare the first parameter pr1, the second parameter pr2, and the fourth parameter pr4, and determine the communication parameter prf using a result of the comparison. For example, the selection unit 670 may determine, as the communication parameter prf, the parameter with the highest received power among the first parameter pr1, the second parameter pr2, and the fourth parameter pr4.

(10) Tenth Example Alteration

In the above example embodiment, the communication parameter prf determined by the selection unit 670 is used for radio communication with the terminal apparatus 100, but the communication parameter prf may be used for purposes other than radio communication with the terminal apparatus 100. In a first example, the base station apparatus 200 may use the communication parameter prf for measuring the reception level (reception power or reception quality) using a reference signal. To assist in determining the "antenna number and beam number" to be used for communication with the terminal apparatus 100, the terminal apparatus 100 may measure an actual received power for the reference signal transmitted by beamforming from the base station antenna 210 of the base station apparatus 200. At this time, the base station apparatus 200 transmits the reference signal using the antenna corresponding to the antenna number determined by the communication parameter prf and the beam corresponding to the beam number determined by the communication parameter prf. This allows the base station apparatus 200 to add signals transmitted according to the communication parameter prf as reference signals to be measured at the terminal apparatus 100. The terminal apparatus 100 can measure the received power with respect to the combination of the antenna and beam that appears promising for improving communication quality, and report the received power to the base station apparatus 200.

In a second example, the base station apparatus 200 may use the communication parameter prf for estimating interference to the terminal apparatus 100. For example, the communication parameter prf can also be used as information indicating the antenna number and beam number for which interference to the terminal apparatus 100 becomes large. It is assumed that the base station apparatus 200 determines at least one second terminal apparatus from among terminal apparatuses other than the terminal apparatus 100. The second terminal apparatus refers to another terminal apparatus that communicates with the base station apparatus 200 at the same time (timing) and on the same frequency when communicating between the terminal apparatus 100 and the base station apparatus 200. The base station apparatus 200 excludes a terminal apparatus that may cause significant interference to the terminal apparatus 100 from candidates for the second terminal apparatus. Specifically, the base station apparatus 200 does not select, as the second terminal apparatus, a terminal apparatus that is expected to have high received power by using the "antenna number and beam number" determined by the communication parameter prf (that is, a terminal apparatus for which it is desirable to use the antenna number and beam number), among from terminal apparatuses other than the terminal apparatus 100. This avoids significant interference to the terminal apparatus 100.

(11) Eleventh Example Alteration

Some or all of the various functional modules included in the base station antenna 210 and the main control apparatus 220 may be implemented in a Radio Unit (RU), a Distributed Unit (DU), or a Center Unit (CU). Some or all of the various functional modules included in the base station antenna 210 and the main control apparatus 220 may be implemented in a control apparatus external to the base station apparatus 200, such as a RAN Intelligent Controller (RIC).

3. Second Example Embodiment

Next, with reference to FIGS. 20 and 21, a second example embodiment will be described. The above-described first example embodiment is a concrete example embodiment, whereas the second example embodiment is a more generalized example embodiment.

<3-1. Configuration of Radio Control Apparatus>

Figure 20:
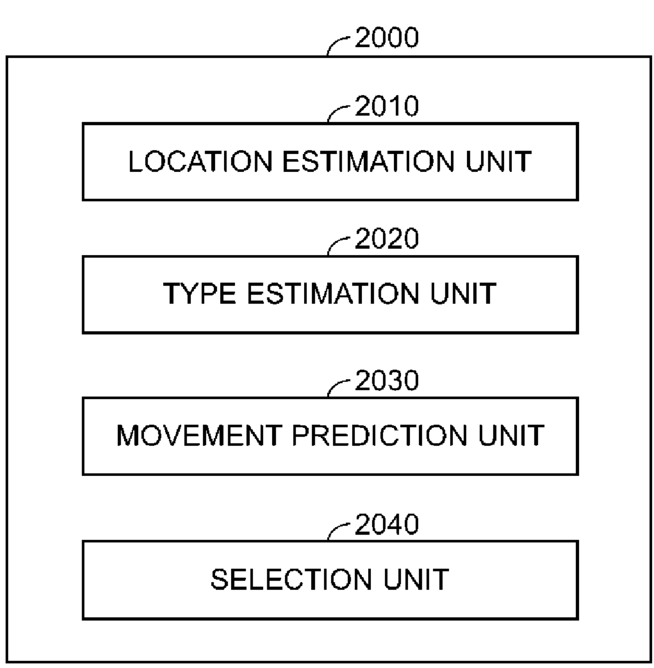
FIG. 20 is a diagram illustrating an example of a configuration of a radio control apparatus according to a second example embodiment.

FIG. 20 is a diagram illustrating an example of a configuration of a radio control apparatus 2000. The radio control apparatus 2000 is configured to perform radio communication with a terminal apparatus 2100. The radio control apparatus 2000 includes a location estimation unit 2010, a type estimation unit 2020, a movement prediction unit 2030, and a selection unit 2040.

The functional modules 2010, 2020, 2030 and 2040 included in the radio control apparatus 2000 may be implemented with one or more processors and a memory. The one or more processors may include, for example, one or more of a CPU, an MPU, and a micro controller. The memory may include a volatile memory and a non-volatile memory. The memory may store a program code (instructions). The one or more processors may implement the functions of the radio control apparatus 2000 by executing the program code stored in the memory.

The location estimation unit 2010 estimates a location of the terminal apparatus 2100. The location estimation unit 2010 may operate in the same manner as the location estimation unit 650 described above.

The type estimation unit 2020 estimates a type of the terminal apparatus 2100. The type estimation unit 2020 may operate in the same manner as the type estimation unit 640 above.

The movement prediction unit 2030 predicts movement of the terminal apparatus 2100 based on the location estimated by the location estimation unit 2010, and predicts a future location Pf of the terminal apparatus 2100. The movement prediction unit 2030 may operate in the same manner as the movement prediction unit 660 described above.

The selection unit 2040 estimates a reception level of a radio signal at the future location Pf for each of a plurality of communication parameters, based on the type estimated by the type estimation unit 2020. Here, the communication parameter represents an antenna, a beam, or a combination of the antenna and the beam.

The selection unit 2040 determines the communication parameter prf to be used for the terminal apparatus 2100 at the future location Pf based on an estimation result of the reception level. The selection unit 2040 may operate in the same manner as the selection unit 670 described above.

<3-2. Flow of Processing>

FIG. 21 is a flowchart for illustrating an example of a flow of processing of the radio control apparatus 2000.

The location estimation unit 2010 estimates the location of the terminal apparatus 2100 (2101). The type estimation unit 2020 estimates the type of the terminal apparatus 2100 (2102).

The movement prediction unit 2030 predicts the movement of the terminal apparatus 2100 based on the above estimated location, and predicts the future location Pf of the terminal apparatus 2100 (2103).

The selection unit 2040 estimates the reception level of the radio signal at the future location Pf for each communication parameter based on the above estimated type (2104). The selection unit 2040 determines the communication parameter prf to be used for the terminal apparatus 2100 at the future location Pf based on the estimation result of the reception level (2105).

According to the above configuration, the radio control apparatus 2000 can control radio communication with the terminal apparatus 2100 in accordance with the moving situation of the terminal apparatus 2100.

Note that the example embodiments and the example alterations described above are merely examples, and the scope of technical ideas of the present disclosure is not limited to the configurations described above. Other example aspects conceivable within the scope of technical ideas of the present disclosure are included in the scope of the present disclosure.

The processing steps illustrated in the flowchart are not necessarily performed in the illustrated order. The processing steps may be performed in an order different from that illustrated, or two or more processing steps may be performed in parallel. Some of the processing steps may be deleted, or further processing steps may be added.

The functions of the apparatuses (the base station apparatus 200 and the radio control apparatus 2000) described in the Specification may be implemented with one of software, hardware, and a combination of software and hardware. A program code (instructions) constituting the software may be stored in a computer readable recording medium inside or outside each of the apparatuses, for example, and when being executed, may be read in a memory to be executed by a processor. Moreover, a non-transitory computer readable recording medium having recorded thereon the program code may be provided.

The whole or part of the example embodiments and the example alterations described above can be described as, but not limited to, the following supplementary notes.

(Supplementary Note 1)

A radio control apparatus comprising:

- a location estimation unit configured to estimate a location of a terminal apparatus;
- a type estimation unit configured to estimate a type of the terminal apparatus;
- a movement prediction unit configured to predict movement of the terminal apparatus based on the estimated location, and predict a future location of the terminal apparatus; and
- a selection unit configured to
  - estimate, based on the estimated type, a reception level of a radio signal at the future location for each communication parameter representing one or both of an antenna and a beam, and
  - determine the communication parameter to be used for the terminal apparatus at the future location, based on an estimation result of the reception level.

(Supplementary Note 2)

The radio control apparatus according to Supplementary Note 1, wherein the type estimation unit is configured to estimate the type of the terminal apparatus based on any one or a combination of two or more of the estimated location of the terminal apparatus, time-series information of the estimated location of the terminal apparatus, map information, a movement speed of the terminal apparatus, and an image acquired by a camera.

(Supplementary Note 3)

The radio control apparatus according to Supplementary Note 2, wherein the type estimation unit is configured to estimate the type of the terminal apparatus based on the estimated location of the terminal apparatus and the image.

(Supplementary Note 4)

The radio control apparatus according to Supplementary Note 2, wherein the type estimation unit is configured to estimate the type of the terminal apparatus by clustering using any one or two or more of the estimated location of the terminal apparatus, the time-series information of the estimated location of the terminal apparatus, and the movement speed of the terminal apparatus.

(Supplementary Note 5)

The radio control apparatus according to any one of Supplementary Notes 2 to 4, wherein the type estimation unit is configured to set a candidate for the type for each area in which the antenna is installed, or for each area in the map information.

(Supplementary Note 6)

The radio control apparatus according to Supplementary Note 5, wherein the candidate for the type is set by an input operation through an external interface or by image processing on the image.

(Supplementary Note 7)

The radio control apparatus according to any one of Supplementary Notes 1 to 6, wherein the movement prediction unit is configured to determine a movement direction and a movement speed of the terminal apparatus based on the type of the terminal apparatus, and predict the future location of the terminal apparatus.

(Supplementary Note 8)

The radio control apparatus according to Supplementary Note 7, wherein the movement prediction unit is configured to determine the movement direction and the movement speed of the terminal apparatus further based on map information.

(Supplementary Note 9)

The radio control apparatus according to Supplementary Note 7, wherein the movement prediction unit is configured to determine the movement direction and the movement speed of the terminal apparatus using a movement prediction model generated from a past movement history of the terminal apparatus.

(Supplementary Note 10)

The radio control apparatus according to any one of Supplementary Notes 1 to 9, further comprising a database configured to store, for each type, a relationship between a location, the communication parameter, and the reception level, wherein the selection unit is configured to refer to the database, and estimate the reception level of the radio signal at the future location for each communication parameter.

(Supplementary Note 11)

The radio control apparatus according to Supplementary Note 10, wherein the database further includes, as a configuration item, at least one of a movement direction, a movement speed, and a time.

(Supplementary Note 12)

The radio control apparatus according to any one of Supplementary Notes 1 to 9, wherein the selection unit is configured to estimate the reception level of the radio signal at the future location using a radio propagation prediction model generated for each type.

(Supplementary Note 13)

The radio control apparatus according to any one of Supplementary Notes 1 to 12, wherein the selection unit is configured to

- compare a first parameter, which is a candidate of the communication parameter to be used for the terminal apparatus at the future location, with a second parameter, which is the communication parameter currently in use for the terminal apparatus, and
- determine, using a result of the comparison, the communication parameter to be used for the terminal apparatus at the future location.

(Supplementary Note 14)

The radio control apparatus according to Supplementary Note 13, wherein the selection unit is configured to determine the communication parameter to be used for the terminal apparatus at the future location, based on a relationship between an estimated reception level in a case of the first parameter, a current reception level in a case of the second parameter, and a threshold.

(Supplementary Note 15)

The radio control apparatus according to Supplementary Note 13 or 14, wherein the selection unit is configured to select a third parameter, which is a candidate of the communication parameter to be used for the terminal apparatus at the future location, for each of a plurality of locations around the future location, in accordance with accuracy of the estimated location or future location of the terminal apparatus, and compare the first parameter, the second parameter, and the third parameter, and determine, using a result of the comparison, the communication parameter to be used for the terminal apparatus at the future location.

(Supplementary Note 16)

The radio control apparatus according to any one of Supplementary Notes 1 to 15, wherein the selection unit is configured to compare the estimated reception level of the terminal apparatus at the future location with a reception level measured when the terminal apparatus actually reaches the future location, and evaluate accuracy of the estimated reception level using a result of the comparison, and determine whether to change the communication parameter currently in use for the terminal apparatus, based on a result of the evaluation.

(Supplementary Note 17)

The radio control apparatus according to any one of Supplementary Notes 1 to 16, wherein the selection unit is configured to determine two or more of the communication parameters to be used for the terminal apparatus at the future location in a case in which a usage rate of radio resource is less than a predetermined usage rate threshold.

(Supplementary Note 18)

The radio control apparatus according to any one of Supplementary Notes 1 to 17, wherein the movement prediction unit is configured to predict a plurality of the future locations, and the selection unit is configured to determine the communication parameter to be used for the terminal apparatus at the future location such that the terminal apparatus satisfies a predetermined condition in a process of passing through the plurality of future locations.

(Supplementary Note 19)

The radio control apparatus according to Supplementary Note 18, wherein the predetermined condition is a condition that a number of times the antenna is changed in the process is less than or equal to a predetermined number-of-times threshold.

(Supplementary Note 20)

The radio control apparatus according to any one of Supplementary Notes 1 to 19, wherein the type is information indicating a type of a moving object holding the terminal apparatus.

(Supplementary Note 21)

The radio control apparatus according to Supplementary Note 20, wherein the type includes one or more of a pedestrian, a bicycle, a motor vehicle, a train, a bullet train, and an unmanned aerial vehicle (UAV).

(Supplementary Note 22)

The radio control apparatus according to any one of Supplementary Notes 1 to 21, wherein the radio control apparatus is configured to use the communication parameter to be used for the terminal apparatus at the future location, for measuring the reception level using a reference signal or estimating interference to the terminal apparatus.

(Supplementary Note 23)

A method performed in a radio control apparatus communicating with a terminal apparatus, the method comprising:

estimating a location of the terminal apparatus;

estimating a type of the terminal apparatus;

predicting movement of the terminal apparatus based on the estimated location, and predicting a future location of the terminal apparatus;

estimating, based on the estimated type, a reception level of a radio signal at the future location for each communication parameter representing one or both of an antenna and a beam; and determining the communication parameter to be used for the terminal apparatus at the future location, based on an estimation result of the reception level.

(Supplementary Note 24)

A non-transitory computer readable recording medium storing a program causing a processor to execute:

estimating a location of a terminal apparatus;

estimating a type of the terminal apparatus;

predicting movement of the terminal apparatus based on the estimated location, and predicting a future location of the terminal apparatus;

estimating, based on the estimated type, a reception level of a radio signal at the future location for each communication parameter representing one or both of an antenna and a beam; and determining the communication parameter to be used for the terminal apparatus at the future location, based on an estimation result of the reception level.

The present application claims priority to U.S. provisional application No. 63/193,639 filed on May 27, 2021, the content of which is hereby incorporated by reference in its entirety.

INDUSTRIAL APPLICABILITY

Radio communication with a terminal apparatus can be controlled in accordance with a movement situation of the terminal apparatus.

REFERENCE SIGNS LIST

10: Radio Communication System
100: Terminal Apparatus
200: Base Station Apparatus
610: First Database
620: Second Database
630: Update Unit
640: Type Estimation Unit
650: Location Estimation Unit
660: Movement Prediction Unit
670: Selection Unit
2000: Radio Control Apparatus
2010: Location Estimation Unit
2020: Type Estimation Unit
2030: Movement Prediction Unit
2040: Selection Unit

What is claimed is:

1. A radio control apparatus comprising:

one or more memories configured to store instructions; and one or more processors configured to execute the instructions to:

estimate a location of a terminal apparatus;

estimate a type of the terminal apparatus;

predict movement of the terminal apparatus based on the estimated location, and predict a future location of the terminal apparatus;

estimate, based on the estimated type, a reception level of a radio signal at the future location for each communication parameter representing one or both of an antenna and a beam;

compare a first parameter, which is a candidate of the communication parameter to be used for the terminal apparatus at the future location, with a second parameter, which is the communication parameter currently in use for the terminal apparatus; and determine, using a result of the comparison, the communication parameter to be used for the terminal apparatus at the future location, based on an estimation result of the reception level.

2. The radio control apparatus according to claim 1, wherein the one or more processors are configured to estimate the type of the terminal apparatus based on any one or a combination of two or more of the estimated location of the terminal apparatus, time-series information of the estimated location of the terminal apparatus, map information, a movement speed of the terminal apparatus, and an image acquired by a camera.

3. The radio control apparatus according to claim 2, wherein the one or more processors are configured to estimate the type of the terminal apparatus based on the estimated location of the terminal apparatus and the image.

4. The radio control apparatus according to claim 2, wherein the one or more processors are configured to estimate the type of the terminal apparatus by clustering using any one or two or more of the estimated location of the terminal apparatus, the time-series information of the estimated location of the terminal apparatus, and the movement speed of the terminal apparatus.

5. The radio control apparatus according to claim 2, wherein the one or more processors are configured to set a candidate for the type for each area in which the antenna is installed, or for each area in the map information.

6. The radio control apparatus according to claim 5, wherein the candidate for the type is set by an input operation via an external interface or by image processing on the image.

7. The radio control apparatus according to claim 1, wherein the one or more processors are configured to determine a movement direction and a movement speed of the terminal apparatus based on the type of the terminal apparatus, and predict the future location of the terminal apparatus.

8. The radio control apparatus according to claim 7, wherein the one or more processors are configured to determine the movement direction and the movement speed of the terminal apparatus further based on map information.

9. The radio control apparatus according to claim 7, wherein the one or more processors are configured to determine the movement direction and the movement speed of the terminal apparatus using a movement prediction model generated from a past movement history of the terminal apparatus.

10. The radio control apparatus according to claim 1, further comprising a database configured to store, for each type, a relationship between a location, the communication parameter, and the reception level, wherein the one or more processors are configured to refer to the database, and estimate the reception level of the radio signal at the future location for each communication parameter.

11. The radio control apparatus according to claim 1, wherein the one or more processors are configured to estimate the reception level of the radio signal at the future location using a radio propagation prediction model generated for each type.

12. The radio control apparatus according to claim 1, wherein the one or more processors are configured to determine the communication parameter to be used for the terminal apparatus at the future location, based on a relationship between an estimated reception level in a case of the first parameter, a current reception level in a case of the second parameter, and a threshold.

13. The radio control apparatus according to claim 1, wherein the one or more processors are configured to:

compare the estimated reception level of the terminal apparatus at the future location with a reception level measured when the terminal apparatus actually reaches the future location, and evaluate accuracy of the estimated reception level using a result of the comparison; and determine whether to change the communication parameter currently in use for the terminal apparatus, based on a result of the evaluation.

14. The radio control apparatus according to claim 1, wherein the one or more processors are configured to determine two or more of the communication parameters to be used for the terminal apparatus at the future location in a case in which a usage rate of radio resource is less than a predetermined usage rate threshold.

15. The radio control apparatus according to claim 1, wherein the one or more processors are configured to:

predict a plurality of the future locations; and determine the communication parameter to be used for the terminal apparatus at the future location such that the terminal apparatus satisfies a predetermined condition in a process of passing through the plurality of future locations.

16. The radio control apparatus according to claim 1, wherein the type is information indicating a type of a moving object holding the terminal apparatus.

17. The radio control apparatus according to claim 1, wherein the one or more processors are configured to use the communication parameter to be used for the terminal apparatus at the future location, for measuring the reception level using a reference signal or estimating interference to the terminal apparatus.

18. A method performed in a radio control apparatus communicating with a terminal apparatus, the method comprising:

estimating a location of the terminal apparatus;

estimating a type of the terminal apparatus;

predicting movement of the terminal apparatus based on the estimated location, and predicting a future location of the terminal apparatus;

estimating, based on the estimated type, a reception level of a radio signal at the future location for each communication parameter representing one or both of an antenna and a beam;

comparing a first parameter, which is a candidate of the communication parameter to be used for the terminal apparatus at the future location, with a second parameter, which is the communication parameter currently in use for the terminal apparatus, and determining, using a result of the comparison, the communication parameter to be used for the terminal apparatus at the future location, based on an estimation result of the reception level.

19. A non-transitory computer readable recording medium storing a program causing a processor to execute:

estimating a location of a terminal apparatus;

estimating a type of the terminal apparatus;

predicting movement of the terminal apparatus based on the estimated location, and predicting a future location of the terminal apparatus;

estimating, based on the estimated type, a reception level of a radio signal at the future location for each communication parameter representing one or both of an antenna and a beam;

comparing a first parameter, which is a candidate of the communication parameter to be used for the terminal apparatus at the future location, with a second parameter, which is the communication parameter currently in use for the terminal apparatus; and determining, using a result of the comparison, the communication parameter to be used for the terminal apparatus at the future location, based on an estimation result of the reception level.

* * * * *